United States Patent
Orlick

(10) Patent No.: US 7,028,178 B2
(45) Date of Patent: Apr. 11, 2006

(54) SCHEDULING SYSTEM AND METHOD INCLUDING CREATING AND/OR CHANGING A SCHEDULING SYSTEM BY AN ADMINISTRATOR AND MAKING APPOINTMENTS EMPLOYING THE SCHEDULE CONDUCTED THROUGH A GLOBAL COMPUTER NETWORK

(75) Inventor: Abraham I. Orlick, Narberth, PA (US)

(73) Assignee: The Herff Jones Company of Indiana, Inc., Indianapolis, IN (US)

(*) Notice: Subject to any disclaimer, the term of this patent is extended or adjusted under 35 U.S.C. 154(b) by 527 days.

(21) Appl. No.: 09/878,082

(22) Filed: Jun. 8, 2001

(65) Prior Publication Data

US 2002/0049733 A1 Apr. 25, 2002

Related U.S. Application Data

(60) Provisional application No. 60/210,210, filed on Jun. 8, 2000.

(51) Int. Cl.
*H04L 9/00* (2006.01)
*G06F 17/60* (2006.01)

(52) U.S. Cl. .................................. 713/150; 705/50

(58) Field of Classification Search ......... 718/100–108; 713/150; 705/1–80; 707/1; 701/1; 709/100–108; 712/28, 200, 214, 220; 711/100, 106, 151; 717/100, 160, 161
See application file for complete search history.

(56) References Cited

U.S. PATENT DOCUMENTS

| | | | | |
|---|---|---|---|---|
| 5,483,588 A | * | 1/1996 | Eaton et al. ........... 379/202.01 |
| 5,855,006 A | * | 12/1998 | Huemoeller et al. .......... 705/9 |
| 5,960,406 A | * | 9/1999 | Rasansky et al. ............. 705/9 |
| 5,963,925 A | * | 10/1999 | Kolling et al. ................ 705/40 |
| 5,970,466 A | * | 10/1999 | Detjen et al. ................... 705/8 |
| 6,345,260 B1 | * | 2/2002 | Cummings et al. ........... 705/8 |
| 2001/0047282 A1 | * | 11/2001 | Raveis ........................... 705/7 |
| 2002/0116232 A1 | * | 8/2002 | Rapp et al. .................... 705/5 |

OTHER PUBLICATIONS

Business Wire, MCI Debuts networkMCI Conferencing Net Scheduler., Sep. 9, 1997, The Gale Group, p9091194.*
IBM Corporation, Calendar Function for Text System, May, 1984, Three Pages.

* cited by examiner

*Primary Examiner*—Meng-Al T. An
*Assistant Examiner*—Kenneth Tang
(74) *Attorney, Agent, or Firm*—Barnes & Thornburg LLP

(57) ABSTRACT

A scheduling system and method. Schedules, created by an administrator, are made available to users through a global computer network, such as the Internet. Authorized users gain access to an administrator's web site and, upon entry of an appropriate access code, obtain access to the schedule. The user may select a time slot which has not been selected or which has not been frozen. The system provides an automatic e-mail reminder of the appointment to the student to the e-mail address entered by the user, who may, for example, be a student making an appointment to sit for a portrait. The administrator can alter certain aspects of the schedule such as moving up the starting date, moving back the closing date, selecting the number of appointments per day and/or the length and starting and ending time of appointments. Each user may change an appointment prior to the scheduled date. The administrator may prevent users from selecting more that one appointment for the same purpose. Users may visit the web site at any given time to confirm, print out, delete, change or update an appointment previously made by that user. The user who is a member of a designated group is provided with messages when an appointment entry is confirmed and may also be provided with information relating to the appointment, such as cost and attire, as well as emergency messages, dealing, for example, with a weather delay.

20 Claims, 56 Drawing Sheets

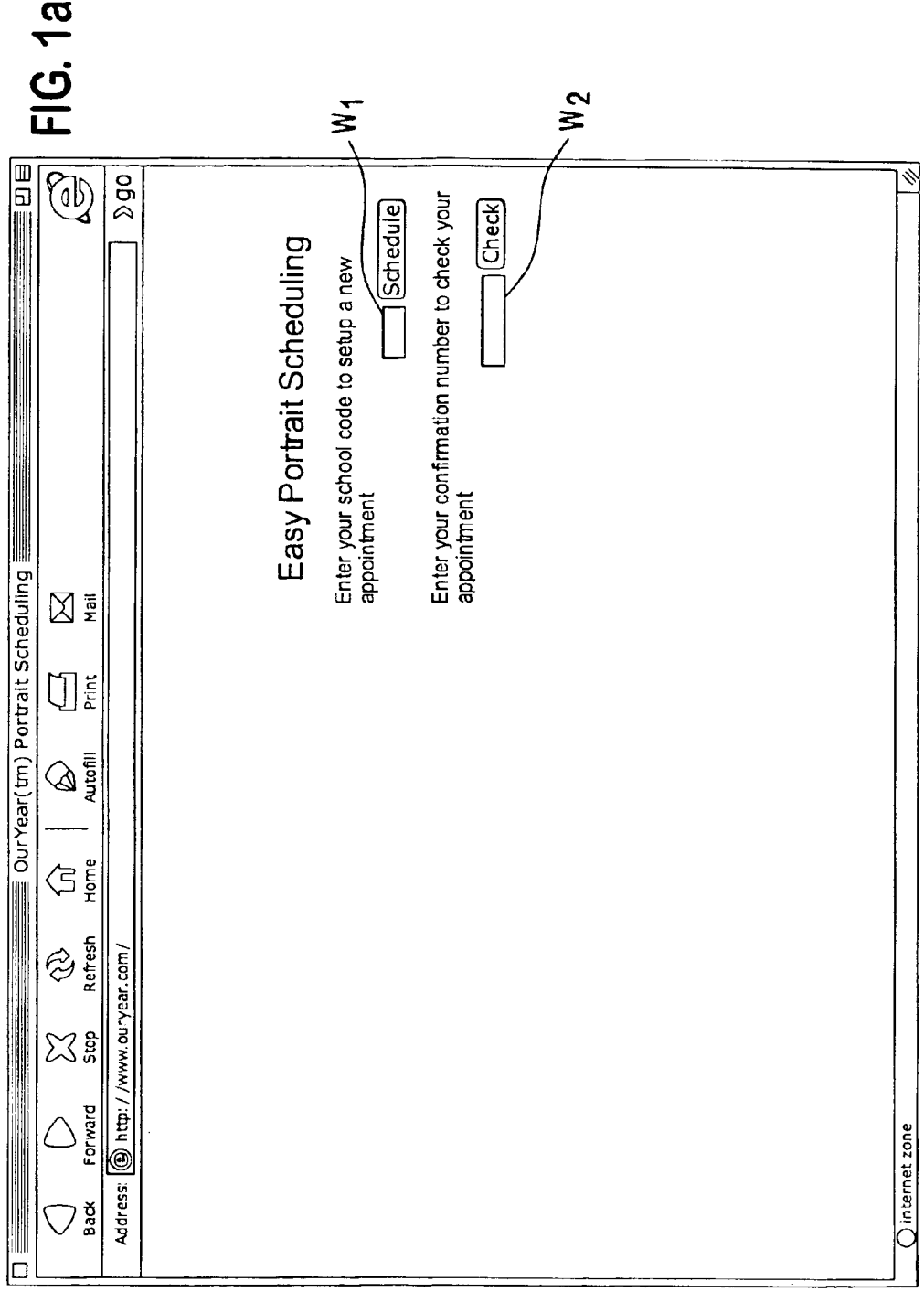

FIG. 1b

OurYear(tm) Portrait Scheduling

Address: http://www.ouryear.com/schedule/index.asp

Figure 1E:
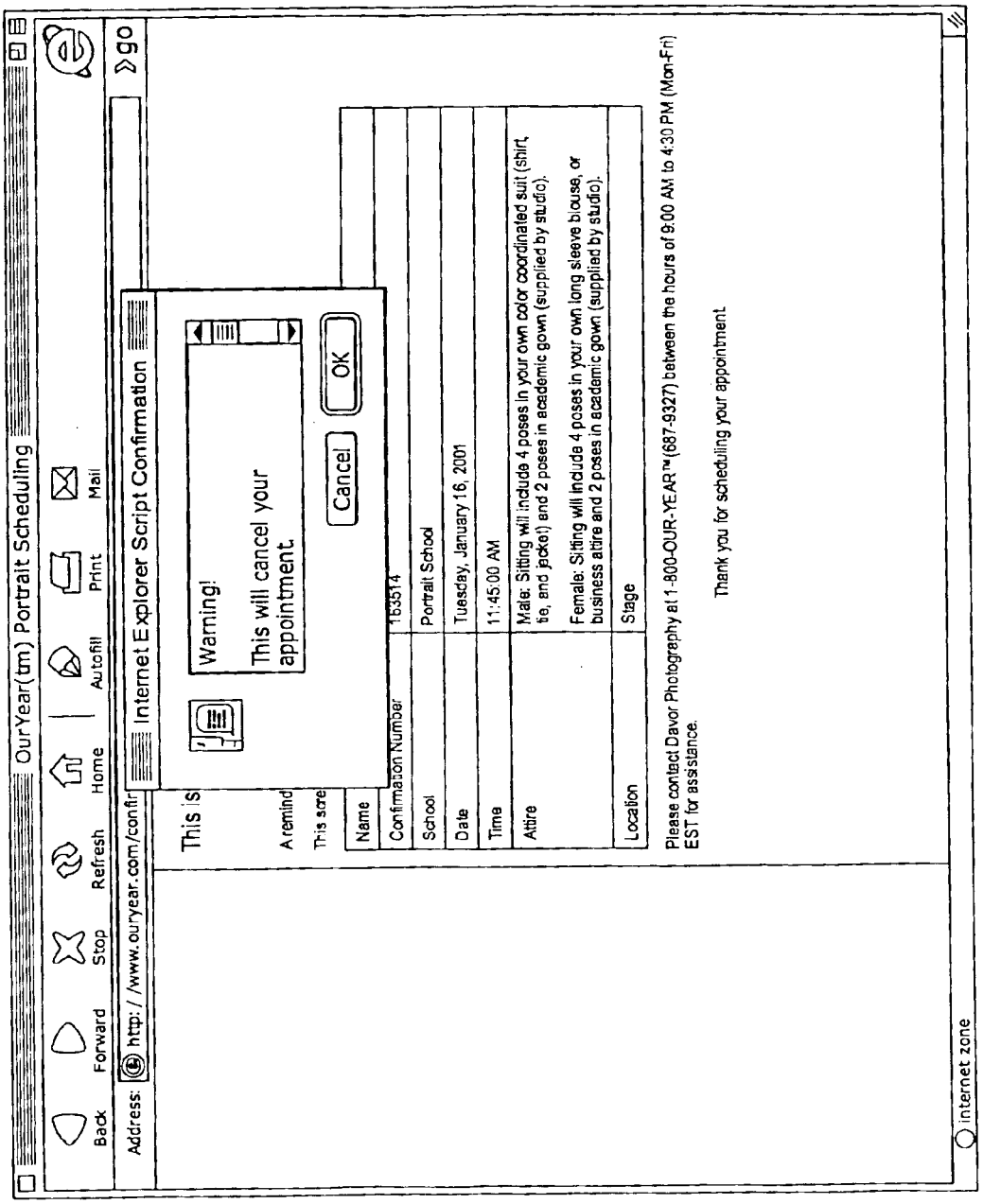

Our Year™ Easy Portrait Scheduling for Portrait School

Step 1: Select a date for your appointment
[Tuesday 01/16/2001] [Get Available Times]

Step 2: Select a time for your appointment
[11:45:00 AM] [Make Appointment]

Step 3: Enter your information and click the "Schedule It" button

First Name: [DaVor]   Last Name: [User]
Local Phone Number: [215-638-2490]   Email Address: [215-638-2490]
Email Address: [r@davor.com]   First Time Photographed? [Yes]
Special Requests: [grey background please]

[Schedule It] [Reset Fields]

internet zone

FIG. 1c

OurYear(tm) Portrait Scheduling

Address: http://www.ouryear.com/schedule/index.asp

Your appointment has been scheduled!

A confirmation email has been sent to you at woods@davor.com. A reminder message will be sent prior to your sitting.

This screen can be printed using your browser's print function.

| Name | DaVor Student3 |
|---|---|
| Confirmation Number | 163310 |
| School | Portrait School |
| Date | Monday, January 15, 2001 |
| Time | 10:00:00 AM |
| Attire | Male: Sitting will include 4 poses in your own color coordinated suit (shirt, tie, and jacket) and 2 poses in academic gown (supplied by studio). Female: Sitting will include 4 poses in your own long sleeve blouse, or business attire and 2 poses in academic gown (supplied by studio). |
| Location | Stage |

Please contact Davor Photography at 1-800-OUR-YEAR™ (687-9327) between the hours of 9:00 AM to 4:30 PM (Mon-Fri) EST for assistance.

Thank you for scheduling your appointment.

[Confirm]

FIG. 1d

OurYear(tm) Portrait Scheduling

Back | Forward | Stop | Refresh | Home | Autofill | Print | Mail

Address: http://www.ouryear.com/confirm/index.asp

This is your confirmed appointment!

[Cancel Appointment]

A reminder email will be sent prior to your sitting.

This screen can be printed using your browser's print function.

| | |
|---|---|
| Name | DaVor User |
| Confirmation Number | 163514 |
| School | Portrait School |
| Date | Tuesday, January 16, 2001 |
| Time | 11:45:00 AM |
| Attire | Male: Sitting will include 4 poses in your own color coordinated suit (shirt, tie, and jacket) and 2 poses in academic gown (supplied by studio). |
| | Female: Sitting will include 4 poses in your own long sleeve blouse, or business attire and 2 poses in academic gown (supplied by studio). |
| Location | Stage |

Please contact Davor Photography at 1-800-OUR-YEAR™ (687-9327) between the hours of 9:00 AM to 4:30 PM (Mon-Fri) EST for assistance.

Thank you for scheduling your appointment internet zone

FIG. 2d

OurYear Portrait Scheduling Administration

Session Monitor

| School | Session | Start Date | End Date | Open | Locked | Scheduled | Total | % Utilized |
|---|---|---|---|---|---|---|---|---|
| 293 | 217 | 11/13/2000 | 11/17/2000 | 58 | 40 | 206 | 304 | 67.76% |
| 17 | 308 | 11/15/2000 | 11/17/2000 | 54 | 0 | 0 | 54 | 0.00% |
| 243 | 237 | 10/30/2000 | 11/17/2000 | 631 | 1760 | 964 | 3345 | 28.52% |
| 328 | 240 | 11/13/2000 | 11/17/2000 | 119 | 174 | 148 | 441 | 33.56% |
| 265 | 216 | 11/06/2000 | 11/17/2000 | 471 | 368 | 339 | 1178 | 28.78% |
| 269 | 218 | 11/06/2000 | 11/17/2000 | 216 | 865 | 582 | 1664 | 34.98% |
| 197 | 262 | 11/13/2000 | 11/17/2000 | 80 | 321 | 344 | 745 | 46.17% |
| 198 | 266 | 11/13/2000 | 11/17/2000 | 223 | 240 | 305 | 768 | 39.71% |
| 246 | 268 | 11/13/2000 | 11/17/2000 | 65 | 166 | 209 | 440 | 47.50% |
| 194 | 259 | 11/13/2000 | 11/17/2000 | 55 | 171 | 214 | 440 | 48.64% |
| 700 | 261 | 11/13/2000 | 11/17/2000 | 50 | 363 | 396 | 809 | 47.71% |
| 705 | 267 | 11/13/2000 | 11/17/2000 | 61 | 102 | 213 | 376 | 56.65% |
| 259 | 269 | 11/13/2000 | 11/17/2000 | 147 | 176 | 117 | 440 | 26.59% |
| 335 | 271 | 11/13/2000 | 11/17/2000 | 31 | 112 | 297 | 440 | 67.50% |
| 272 | 273 | 11/13/2000 | 11/20/2000 | 84 | 419 | 265 | 768 | 34.51% |
| 235 | 235 | 10/30/2000 | 11/21/2000 | 720 | 2558 | 769 | 4047 | 19.00% |
| 501 | 272 | 11/13/2000 | 11/21/2000 | 214 | 728 | 539 | 1481 | 36.39% |
| 166 | 291 | 11/20/2000 | 11/21/2000 | 127 | 40 | 81 | 248 | 32.66% |
| 91 | 276 | 11/20/2000 | 11/23/2000 | 104 | 176 | 104 | 384 | 27.08% |
| 340 | 285 | 11/27/2000 | 11/29/2000 | 72 | 160 | 32 | 264 | 12.12% |
| 330 | 309 | 11/28/2000 | 11/30/2000 | 108 | 88 | 0 | 176 | 0.00% |
| 721 | 281 | 11/28/2000 | 11/30/2000 | 104 | 96 | 64 | 264 | 24.24% |
| 230 | 236 | 11/27/2000 | 12/01/2000 | 324 | 352 | 204 | 880 | 23.18% |
| 1330 | 310 | 12/01/2000 | 12/01/2000 | 64 | 24 | 0 | 88 | 0.00% |
| 237 | 278 | 11/27/2000 | 12/01/2000 | 153 | 176 | 111 | 440 | 26.23% |
| 295 | 280 | 11/28/2000 | 12/01/2000 | 209 | 136 | 7 | 352 | 1.99% |
| 72 | 284 | 11/27/2000 | 12/01/2000 | 167 | 176 | 97 | 440 | 22.05% |

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password

Logoff

FIG. 2e

Session Monitor

| School | Session | Start Date | End Date | Open | Locked | Scheduled | Total | % Utilized |
|---|---|---|---|---|---|---|---|---|
| 290 | 274 | 11/13/2000 | 11/15/2000 | 39 | 96 | 129 | 264 | 48.86% |
| 293 | 217 | 11/13/2000 | 11/17/2000 | 74 | 40 | 190 | 304 | 62.50% |
| 17 | 308 | 11/15/2000 | 11/17/2000 | 54 | 0 | 0 | 54 | 0.00% |
| 243 | 237 | 10/30/2000 | 11/17/2000 | 634 | 1760 | 951 | 3345 | 28.43% |
| 328 | 240 | 11/13/2000 | 11/17/2000 | 125 | 174 | 142 | 441 | 32.20% |
| 265 | 216 | 11/06/2000 | 11/17/2000 | 471 | 368 | 339 | 1178 | 28.78% |
| 269 | 218 | 11/06/2000 | 11/17/2000 | 228 | 865 | 571 | 1664 | 34.31% |
| 197 | 262 | 11/13/2000 | 11/17/2000 | 79 | 321 | 345 | 745 | 46.31% |
| 198 | 266 | 11/13/2000 | 11/17/2000 | 231 | 240 | 297 | 768 | 38.67% |
| 246 | 268 | 11/13/2000 | 11/17/2000 | 65 | 166 | 209 | 440 | 47.50% |
| 194 | 259 | 11/13/2000 | 11/17/2000 | 54 | 171 | 215 | 440 | 48.86% |
| 700 | 261 | 11/13/2000 | 11/17/2000 | 57 | 361 | 390 | 808 | 48.27% |
| 705 | 267 | 11/13/2000 | 11/17/2000 | 18 | 94 | 208 | 320 | 65.00% |
| 259 | 269 | 11/13/2000 | 11/17/2000 | 153 | 176 | 111 | 440 | 25.23% |
| 335 | 271 | 11/13/2000 | 11/17/2000 | 36 | 112 | 292 | 440 | 66.36% |
| 272 | 273 | 11/13/2000 | 11/20/2000 | 35 | 411 | 258 | 704 | 36.65% |
| 235 | 235 | 10/30/2000 | 11/21/2000 | 755 | 2558 | 734 | 4047 | 18.14% |
| 501 | 272 | 11/13/2000 | 11/21/2000 | 240 | 728 | 513 | 1481 | 34.64% |
| 166 | 291 | 11/20/2000 | 11/21/2000 | 127 | 40 | 81 | 248 | 32.66% |
| 91 | 276 | 11/20/2000 | 11/23/2000 | 114 | 176 | 94 | 384 | 24.48% |
| 340 | 285 | 11/27/2000 | 11/29/2000 | 75 | 160 | 29 | 264 | 10.98% |
| 330 | 309 | 11/28/2000 | 11/30/2000 | 108 | 68 | 0 | 176 | 0.00% |
| 721 | 281 | 11/28/2000 | 11/30/2000 | 111 | 96 | 57 | 264 | 21.59% |
| 230 | 236 | 11/27/2000 | 12/01/2000 | 326 | 352 | 202 | 880 | 22.95% |
| 1330 | 310 | 12/01/2000 | 12/01/2000 | 64 | 24 | 0 | 88 | 0.00% |
| 237 | 278 | 11/27/2000 | 12/01/2000 | 162 | 176 | 102 | 440 | 23.18% |
| 295 | 280 | 11/28/2000 | 12/01/2000 | 210 | 136 | 6 | 352 | 1.70% |

FIG. 2f

OurYear Portrait Scheduling Administration

Session Monitor

| School | Session | Start Date | End Date | Open | Locked | Scheduled | Total | % Utilized |
|---|---|---|---|---|---|---|---|---|
| 290 | 274 | 11/13/2000 | 11/15/2000 | 39 | 96 | 129 | 264 | 48.86% |
| 293 | 217 | 11/13/2000 | 11/17/2000 | 74 | 40 | 190 | 304 | 62.50% |
| 17 | 308 | 11/15/2000 | 11/17/2000 | 54 | 0 | 0 | 54 | 0.00% |
| 243 | 237 | 10/30/2000 | 11/17/2000 | 634 | 1760 | 951 | 3345 | 28.43% |
| 328 | 240 | 11/13/2000 | 11/17/2000 | 125 | 174 | 142 | 441 | 32.20% |
| 265 | 216 | 11/06/2000 | 11/17/2000 | 471 | 368 | 339 | 1178 | 28.78% |
| 269 | 218 | 11/06/2000 | 11/17/2000 | 228 | 865 | 571 | 1664 | 34.31% |
| 197 | 262 | 11/13/2000 | 11/17/2000 | 79 | 321 | 345 | 745 | 46.31% |
| 198 | 266 | 11/13/2000 | 11/17/2000 | 231 | 240 | 297 | 768 | 38.67% |
| 246 | 268 | 11/13/2000 | 11/17/2000 | 65 | 166 | 209 | 440 | 47.50% |
| 194 | 259 | 11/13/2000 | 11/17/2000 | 54 | 171 | 215 | 440 | 48.86% |
| 700 | 261 | 11/13/2000 | 11/17/2000 | 57 | 361 | 390 | 808 | 48.27% |
| 705 | 267 | 11/13/2000 | 11/17/2000 | 18 | 94 | 208 | 320 | 65.00% |
| 259 | 269 | 11/20/2000 | 11/21/2000 | 153 | 176 | 111 | 440 | 25.23% |
| 335 | 271 | 11/20/2000 | 11/21/2000 | 36 | 112 | 292 | 440 | 66.36% |
| 272 | 273 | 11/13/2000 | 11/23/2000 | 35 | 411 | 258 | 704 | 36.65% |
| 235 | 235 | 10/30/2000 | 11/29/2000 | 755 | 2558 | 734 | 4047 | 18.14% |
| 501 | 272 | 11/13/2000 | 11/30/2000 | 240 | 728 | 513 | 1481 | 34.84% |
| 166 | 291 | 11/20/2000 | 11/30/2000 | 127 | 40 | 81 | 248 | 32.66% |
| 91 | 276 | 11/20/2000 | 12/01/2000 | 114 | 176 | 94 | 384 | 24.48% |
| 340 | 285 | 11/27/2000 | 12/01/2000 | 75 | 160 | 29 | 264 | 10.98% |
| 330 | 309 | 11/28/2000 | 11/30/2000 | 108 | 68 | 0 | 176 | 0.00% |
| 721 | 281 | 11/28/2000 | 11/30/2000 | 111 | 96 | 57 | 264 | 21.59% |
| 230 | 236 | 11/27/2000 | 12/01/2000 | 326 | 352 | 202 | 880 | 22.95% |
| 1330 | 310 | 12/01/2000 | 12/01/2000 | 64 | 24 | 0 | 88 | 0.00% |
| 237 | 278 | 11/27/2000 | 12/01/2000 | 162 | 176 | 102 | 440 | 23.18% |
| 295 | 280 | 11/28/2000 | 12/01/2000 | 210 | 136 | 6 | 352 | 1.70% |

Administrative Tools
Session Monitor
School Maintenance
Messaging Maintenance
Attire Maintenance
Student Notifier Scheduling Tools
New Appointment
Find Student Info Reports
Summary Report
Overview Report
School Session Report
Schedule Report
Schedule Duplicates
Operator Scheduling Search
By School
By Session Account Maintenance
Change Password Logoff

School Maintenance

Modify [Select One ▼] or Enter School ID [____] [Get School Info] or [____] [Create New School]

School ID [1]
School Name [Portrait School]
School URL [http://www.davor.com]
URL Descripton (Message) [BRING DATA FORM WITH YOU ▲▼]

[Update School] [Reset Fields]

Active Session Information

| School Year | Start Date | End Date |
|---|---|---|
| 2001 | 01/15/2001 | 01/17/2001 |

[Modify Session] [Extend Session]
[Delete Session] [Create Session]

Deleted Session Information

| School Year | Start Date | End Date |
|---|---|---|
| 2000 | 08/30/1999 | 09/10/1999 |

[Restore Session] [Hard Delete]

Once this action is completed it cannot be undone. All school related information such as sessions and scheduling information will be removed from the database forever. [Delete School]

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password
Account Manager

Logoff

FIG. 2j

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password
Account Manager

Logoff

School Maintenance

Modify [Select One ▼] or Enter School ID [ ] [Get School Info] or [ ] [Create New School]

School ID [ 1 ]
School Name [Portrait School]
School URL [http://www.davor.com]
URL Description (Message) [BRING DATA FORM WITH YOU]

Microsoft Internet Explorer ⚠ Session 1 restored [OK]

[Update School] [Reset Fields]

Active Session Information

| School Year | Start Date |
|---|---|
| 2001 | 01/15/2001 |

[Modify Session] [Extend Session]
[Delete Session] [Create Session]

Deleted Session Information

| School Year | Start Date | End Date |
|---|---|---|
| 2000 | 08/10/1999 | 09/10/1999 |

[Restore Session] [Hard Delete]

Once this action is completed it cannot be undone. All school related information such as sessions and scheduling information will be removed from the database forever.

[Delete School]

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password
Account Manager

Logoff

Session Maintenance

Go To School [Select One ▼]
or Enter School ID [ ] [Get School Info]    or    [Create New Session]

| | |
|---|---|
| Session ID | 289 |
| School ID | [72654] Davor Test School ▼ |
| School Year | 2001 |
| Start Date | 11/27/2000 |
| End Date | 11/30/2000 |
| Fee 1 Amount | 20 |
| Fee 1 Description | Sitting Fee     [Sitting Fee] |
| Fee 2 Amount | 5 |
| Fee 2 Description | Resit Fee      [Resit Fee] |
| Fee 3 Amount | |
| Fee 3 Description | |
| Female Attire | DRAPE ▼ |
| Male Attire | M 654 ▼ |
| Show Warning? | Yes ▼ |

[Update Session]  [Extend Session]
                  [Reset Fields]

Session Day Information

| Day | Start Time | End Time | Lock Status | Buckets |
|---|---|---|---|---|
| Mon 11/27/2000 | 9:00:00 AM | 7:45:00 PM | Available | 4 |
| Tue 11/27/2000 | 9:00:00 AM | 7:45:00 PM | Available | 4 |
| Wed 11/27/2000 | 9:00:00 AM | 7:45:00 PM | Available | 4 |
| Thu 11/27/2000 | 9:00:00 AM | 7:45:00 PM | Available | 4 |

[Update Day]  [Lock/Unlock Day]

FIG. 2q

FIG. 2r

| Administrative Tools | School: Portrait School |
| --- | --- |
| Session Monitor | Session Day: Monday, 01/15/2001 |
| School Maintenance | |
| Messaging Maintenance | To change the lock status of any given bucket, check or uncheck the box next to the status indicator |
| Attire Maintenance | To change the lock status of all buckets at a particular time interval, check the box at the far right of the row. |
| Student Notifier | |

| Time | Bucket 1 | | Bucket 2 | | Bucket 3 | | Bucket 4 | | |
| --- | --- | --- | --- | --- | --- | --- | --- | --- | --- |
| 9:00:00 AM | X | ☐ | X | ☐ | X | ☐ | X | ☐ | ☐ |
| 9:15:00 AM | ☐ | ☑ | ☐ | ☑ | ☐ | ☑ | ☐ | ☑ | ☐ |
| 9:30:00 AM | X | ☑ | ☐ | ☑ | ☐ | ☑ | ☐ | ☑ | ☐ |
| 9:45:00 AM | X | ☑ | ☐ | ☑ | ☐ | ☑ | ☐ | ☑ | ☐ |
| 10:00:00 AM | ☐ | ☑ | ☐ | ☑ | ☐ | ☑ | ☐ | ☑ | ☐ |
| 10:15:00 AM | X | ☑ | ☐ | ☑ | ☐ | ☑ | ☐ | ☑ | ☐ |
| 10:30:00 AM | ☐ | ☑ | ☐ | ☑ | ☐ | ☑ | ☐ | ☑ | ☐ |
| 10:45:00 AM | ☐ | ☑ | ☐ | ☑ | ☐ | ☑ | ☐ | ☑ | ☐ |
| 11:00:00 AM | ☐ | ☐ | ☐ | ☐ | ☐ | ☐ | ☐ | ☐ | ☐ |
| 11:15:00 AM | ☐ | ☐ | ☐ | ☐ | ☐ | ☐ | ☐ | ☐ | ☐ |
| 11:30:00 AM | ☐ | ☐ | ☐ | ☐ | ☐ | ☐ | ☐ | ☐ | ☐ |
| 11:45:00 AM | ☐ | ☐ | ☐ | ☐ | ☐ | ☐ | ☐ | ☐ | ☐ |
| 12:00:00 PM | ☐ | ☐ | ☐ | ☐ | ☐ | ☐ | ☐ | ☐ | ☐ |
| 12:15:00 PM | ☐ | ☐ | ☐ | ☐ | ☐ | ☐ | ☐ | ☐ | ☐ |
| 12:30:00 PM | ☐ | ☐ | ☐ | ☐ | ☐ | ☐ | ☐ | ☐ | ☐ |
| 12:45:00 PM | ☐ | ☐ | ☐ | ☐ | ☐ | ☐ | ☐ | ☐ | ☐ |
| 1:00:00 PM | ☐ | ☐ | ☐ | ☐ | ☐ | ☐ | ☐ | ☐ | ☐ |
| 1:15:00 PM | ☐ | ☐ | ☐ | ☐ | ☐ | ☐ | ☐ | ☐ | ☐ |
| 1:30:00 PM | ☐ | ☐ | ☐ | ☐ | ☐ | ☐ | ☐ | ☐ | ☐ |
| 1:45:00 PM | ☐ | | ☐ | | ☐ | | ☐ | | ☐ |
| 2:00:00 PM | ☐ | | ☐ | | ☐ | | ☐ | | ☐ |

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password

Logoff

FIG. 2s

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password
Account Manager

Logoff

---

Session Maintenance

Go To School [Select One ▼]   or   [ Create New Session ]
or Enter School ID [          ]   [ Get School Info ]

Session ID  289

Location  [Select One ▼]  [ New Location ]  [ Edit Location ]

New Start Date  *Replace 11/27/2000*  ◇

New End Date  *Replace 11/30/2000*  ◇

Show Warning?  [Yes ▼]

Specify Default Values
Values specified here will be used in the creation of the Session Day(s). All values can be changed individually after the records are created.

Default Start Time          Default End Time
[9:00 AM]  ⓘ                [7:45 PM]  ⓘ

Number of Buckets           Lock Saturdays?
[4]                         ☑ Yes

[ Extend Session ]
[ Reset Fields ]

FIG. 2t

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password
Account Manager

Logoff

Messaging Maintenance

Modify [Select One ▼] or [ View Universal Messages ] or [ Create New Message ]

Messages for selected school...

| Start Date | Expire Date | Message Text |
|---|---|---|
| 01/03/2001 | 01/30/2001 | This is a test message |
| 11/27/2000 | 11/27/2000 | PLEASE BRING DATA FORM FOR YOUR APPOINTMENT |
| 11/06/2000 | 11/27/2000 | This is a confirmation message |

Message Editor

School (leave empty if all schools)   [72654] Davor Test School ▼

Message Type   General ▼

Message Text   This is a test message

Start Date   01/03/2001
Expire Date   01/10/2001

[ Update Message ]   [ Delete Message ]   [ Reset Fields ]

FIG. 2v

Attire Maintenance

Administrative Tools
Session Monitor
School Maintenance
Messaging Maintenance
Attire Maintenance
Student Notifier Scheduling Tools
New Appointment
Find Student Info Reports
Summary Report
Overview Report
School Session Report
Schedule Report
Schedule Duplicates
Operator Scheduling Search
By School
By Session Account Maintenance
Change Password
Account Manager Logoff Modify [Select One ▼] or [Create New Attire] — B1

Code [Costume]
Type [M ▼]
Description [Test attire for test school]

[Update Attire] [Reset Fields]

FIG. 2w

FIG. 2x

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password
Account Manager

Logoff

Student Notifier

Click here to view Notifier History Log

School: [1] Portrait School
Date Range: 01/15/2001 — 01/17/2001
Time Range: 09:00 AM — 01:45 PM
Subject: Test Message
Message: This is

[Send Message]

Click to preview distribution list

Distribution List Preview

| Appointment Time | Student Name | Student Email | School & Session |
|---|---|---|---|
| 01/15/2001 @ 9:00:00 AM | KATHY HAMMER | KATHY@DAVOR.COM | Portrait School (282) |
| 01/15/2001 @ 9:00:00 AM | Davor Users | woods@davor.com | Portrait School (282) |
| 01/15/2001 @ 9:45:00 AM | Davor Student2 | woods@davor.com | Portrait School (282) |
| 01/15/2001 @ 10:00:00 AM | Davor Student3 | woods@davor.com | Portrait School (282) |
| 01/15/2001 @ 10:45:00 AM | Davor Users | woods@davor.com | Portrait School (282) |
| 01/16/2001 @ 9:15:00 AM | Clancy Finklestein | woods@davor.com | Portrait School (282) |
| 01/16/2001 @ 9:45:00 AM | Jessica Woods | woods@davor.com | Portrait School (282) |
| 01/16/2001 @ 9:45:00 AM | DaVor Student | woods@davor.com | Portrait School (282) |
| 01/16/2001 @ 11:30:00 AM | DaVor User | davor@davor.com | Portrait School (282) |
| 01/16/2001 @ 12:00:00 PM | DaVor Users | woods@davor.com | Portrait School (282) |
| 01/17/2001 @ 9:45:00 AM | DaVor Student | davor@davor.com | Portrait School (282) |

Close

FIG. 2y

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password
Account Manager

Logoff

Student Notifier

Click here to view Notifier History Log

There are no appointments scheduled in the parameters that were provided.

FIG. 2z

FIG. 2ab

OurYear(tm) Portrait Scheduling Administration

Back | Forward | Stop | Refresh | Home | Autofill | Print | Mail

Address: http://www.ouryear.com/admin/index.asp

Scheduling Tools
New Appointment
Find Student Info

Reports
Schedule Report

Account Maintenance
Change Password

Logoff

Your appointment has been scheduled!

This screen can be printed using your browser's print function

| Name | DaVor Users |
|---|---|
| Confirmation Number | 183323 |
| School | Portrait School |
| Date | Monday January 15, 2001 |
| Time | 10:45:00 AM |
| Attire | Male: Sitting will include 4 poses in your own color-coordinated suit (shirt, tie, and jacket) and 2 poses in academic gown (supplied by studio).<br><br>Female: Sitting will include 4 poses in your own long sleeve blouse, or business attire and 2 poses in academic gown (supplied by studio). |
| Location | Stage |
| Special Message: | BRING DATA FORM |

Please contact Davor Photography at 1-800-OUR-YEAR™ (687-9327) between the hours of 9:00 AM to 4:30 PM (Mon- Fri) EST for assistance.

Thank you for scheduling your appointment

[Confirm]

internet zone

FIG. 2ad

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password
Account Manager

Logoff

Search By Student

Search by any combination of fields below

First Name [ ]  Last Name [ ]  Phone Number [ ]

Email Address [ ]  Confirmation Number [ ]  [Search]

Your search returned 3 results

| | | | | | |
|---|---|---|---|---|---|
| | | (1) Portrait School | | | |
| Name | Jessica Woods | | Session | | 267 |
| Home Phone | 5545565656 | | Local Phone | | 0939606865 |
| Email | woods@davor.com | | Confirmation No. | | 163482 |
| Date | 01/18/2001 | | Time | | 9:45:00 AM |
| | [New Appointment] | [Cancel Appointment] | | Scheduled By: Web Scheduled | |
| | | (960) New Test School | | | |
| Name | Jessica woods | | Session | | 202 |
| Home Phone | 215-638-2490 | | Local Phone | | 0 |
| Email | woods@davor.com | | Confirmation No. | | JWS983272939391 |
| Date | 12/10/1999 | | Time | | 10:00:00 AM |
| | [New Appointment] | [Cancel Appointment] | | Scheduled By: Web Scheduled | |
| | | (8888) DaVor Studio | | | |
| Name | Jessica Woods | | Session | | 195 |
| Home Phone | 215-638-2490 | | Local Phone | | 215-638-2490 |
| Email | jmwoods@davor.com | | Confirmation No. | | JWS9034020120 1 |
| Date | 05/23/2000 | | Time | | 12:45:00 PM |
| | | This session has been marked as deleted. | | | |
| | [New Appointment] | [Cancel Appointment] | | Scheduled By: Web Scheduled | |

FIG. 2ae

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password
Account Manager

Logoff

Enter School [ ] or Select School [E726543 Davor Test School ▼] — B1
Select Session [2001 11/27/2000 to 11/30/2000 ▼]

Summary Report for 72654 - Davor Test School (Session 289)

Click Here to Download in MS Word Format

If you received an error message after generating the word document, click here to attempt to access the file.

Week 1

| Date | Open | Locked | Scheduled | Total |
|---|---|---|---|---|
| 11/27/2000 (9:00:00 AM to 7:45:00 PM) | 176 | 0 | 0 | 176 |
| 11/28/2000 (9:00:00 AM to 7:45:00 PM) | 176 | 0 | 0 | 176 |
| 11/29/2000 (9:00:00 AM to 7:45:00 PM) | 176 | 0 | 0 | 176 |
| 11/30/2000 (9:00:00 AM to 7:45:00 PM) | 176 | 0 | 0 | 176 |
| Totals | 704 | 0 | 0 | 704 |

| Totals For Session # | Open | Locked | Scheduled | Total |
|---|---|---|---|---|
| 289 | 704 | 176 | | 704 |

FIG. 2af

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling Logoff

Search
By School
By Session

Account Maintenance
Change Password
Account Manager

Enter School [ 1 ] or Select School [ [1] Portrait School ▼ ] — B1
Select Session [ 2001 01/15/2001 to 01/17/2001 ▼ ]

Overview Report for Portrait School (Session 282)

Click Here to Download in MS Word Format

If you received an error message after generating the word document, click here to attempt to access the file.

Week 1

| Time | Monday 01/15/2001 Available | Tuesday 01/16/2001 Available | Wednesday 01/17/2001 Available |
|---|---|---|---|
| 9:00:00 AM | 2 | 0 | 0 |
| 9:15:00 AM | 0 | 1 | 0 |
| 9:30:00 AM | 0 | 0 | 0 |
| 9:45:00 AM | 1 | 2 | 1 |
| 10:00:00 AM | 0 | 0 | 0 |
| 10:15:00 AM | 1 | 0 | 0 |
| 10:30:00 AM | 0 | 0 | 0 |
| 10:45:00 AM | 1 | 0 | 0 |
| 11:00:00 AM | 0 | 0 | 0 |
| 11:15:00 AM | 0 | 1 | 0 |
| 11:30:00 AM | 0 | 0 | 0 |
| 11:45:00 AM | 0 | 1 | 0 |
| 12:00:00 PM | 0 | 1 | 0 |
| 12:15:00 PM | 0 | 0 | 0 |
| 12:30:00 PM | 0 | 0 | 0 |
| 12:45:00 PM | 0 | 0 | 0 |
| 1:00:00 PM | 0 | 0 | 0 |
| 1:15:00 PM | 0 | 0 | 0 |
| 1:30:00 PM | 0 | 0 | 0 |

FIG. 2ag

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password
Account Manager

Logoff

School Session Report

Click here to Download in MS Word Format

If you received an error message after generating the word document, click here to attempt to access the file.

Click here to Download in MS Excel Format

Portrait Studio (1)

| SessionID | Session Start Date | Session End Date | School Year |
|---|---|---|---|
| 202 | 01/15/2001 | 01/17/2001 | 2001 |
| 1 | 08/30/1999 | 09/10/1999 | 2000 |

EASTON HIGH SCHOOL (8)

| SessionID | Session Start Date | Session End Date | School Year |
|---|---|---|---|
| 2 | 07/19/2000 | 07/20/2000 | 2001 |

LAFAYETTE COLLEGE (10)

| SessionID | Session Start Date | Session End Date | School Year |
|---|---|---|---|
| 5 | 10/24/2000 | 10/27/2000 | 2001 |
| 4 | 09/11/2000 | 09/14/2000 | 2001 |
| 3 | 10/26/1999 | 10/29/1999 | 2000 |

CLARION UNIVERSITY (17)

| SessionID | Session Start Date | Session End Date | School Year |
|---|---|---|---|
| 7 | 09/18/2000 | 09/22/2000 | 2001 |
| 6 | 03/20/2000 | 03/24/2000 | 2001 |

BUCKETS (17)

| SessionID | Session Start Date | Session End Date | School Year |
|---|---|---|---|
| 244 | 10/17/2000 | 10/18/2000 | 2001 |

UNIVERSITY OF THE SCIENCES (18)

| SessionID | Session Start Date | Session End Date | School Year |
|---|---|---|---|
| 233 | 10/20/2000 | 10/23/2000 | 2001 |

KUTZTOWN UNIVERSITY (22)

| SessionID | Session Start Date | Session End Date | School Year |
|---|---|---|---|
| 246 | 11/06/2000 | 11/10/2000 | 2001 |

WILLIAM PENN CHARTER (23)

| SessionID | Session Start Date | Session End Date | School Year |
|---|---|---|---|
| 9 | 09/06/2000 | 09/08/2000 | 2001 |

13. LAURA SMYTH (Local Phone: 00 Home Phone: 6104307843)
    11/11/2000 2:15:00 PM (BucketID 96414) ☐ Check to Delete
    11/18/2000 2:15:00 PM (BucketID 96030) ☐ Check to Delete 14. ANTHONY TRUGLIO (Local Phone: 00 Home Phone: 2159490745 Email: SCHEDULE@DAVOR.COM)
    09/30/2000 1:15:00 PM (BucketID 78634) ☐ Check to Delete
    10/11/2000 4:45:00 PM (BucketID 105056) ☐ Check to Delete 15. JENNIFER TULENKO (Local Phone: 00 Home Phone: 2156456691)
    10/21/2000 11:15:00 AM (BucketID 155384) ☐ Check to Delete
    11/1/2000 10:45:00 AM (BucketID 96386) ☐ Check to Delete

[Delete Selected]

Logoff

FIG. 2ak

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password
Account Manager

Logoff

Enter School [1]   or   Select Operator [Typical Administrative User ▼]
[1] Portrait School ▼
Select Session [2001 01/15/2001 to 01/17/2001 ▼]

Operator Scheduling Report for Portrait School (Session 282)

| Operator | Appointments Scheduled |
|---|---|
| Kathy Hammer | 1 |
| operator user | 1 |
| Web Scheduled | 9 |

FIG. 2al

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password
Account Manager

Logoff

Enter School [ ] or Select School [▼]
Select Session [Select One ▼] Select Operator [Patty Batezl ▼]

Operator Scheduling Report for Patty Batezl

| School | Session | Appointments Scheduled |
|---|---|---|
| BABSON COLLEGE | 271 | 1 |
| BALDWIN-WALLACE COLLEGE | 231 | 3 |
| BENTLEY COLLEGE | 252 | 3 |
| BLOOMSBURG UNIVERSITY | 270 | 24 |
| BLOOMSBURG UNIVERSITY | 291 | 9 |
| BOSTON UNIVERSITY | 235 | 12 |
| BRANDEIS UNIVERSITY | 225 | 8 |
| BRIDGEWATER STATE COLLEGE | 226 | 2 |
| BROWN UNIVERSITY | 100 | 18 |
| BUCKNELL UNIVERSITY | 249 | 1 |
| CLARK UNIVERSITY | 253 | 3 |
| COLLEGE OF NOTRE DAME | 173 | 2 |
| COLLEGE OF THE HOLY CROSS | 84 | 16 |
| COOK COLLEGE | 276 | 4 |
| DARTMOUTH COLLEGE | 237 | 4 |
| DaVor Studio | 199 | 109 |
| DELAWARE STATE UNIVERSITY | 281 | 3 |
| DELAWARE VALLEY COLLEGE | 274 | 13 |
| Douglase College | 221 | 11 |
| FRAMINGHAM STATE COLLEGE | 292 | 1 |
| GEORGE MASON UNIVERSITY | 261 | 19 |
| GWYNEDD-MERCY COLLEGE | 255 | 2 |
| HOLY FAMILY COLLEGE | 222 | 2 |
| JOHNS HOPKINS UNIVERSITY | 175 | 6 |

FIG. 2am

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report
Schedule Report
Schedule Duplicates
Operator Scheduling

Search
By School
By Session

Account Maintenance
Change Password
Account Manager

Logoff

Select One | Select One
Select Session | Select One

Enter School [ ] or Select Operator
Select School [▼] | Patty Batezl [▼]  — B1

Operator Scheduling Report for Patty Batezl

The reported number of appointments scheduled in the Operator Tally report may differ slightly from other reports because the Operator Tally report is derived from a table that is updated each time an operator schedules an appointment, whereas the other reports provide snapshot information from the currently scheduled appointments. An appointment being cancelled will not remove the count from the day for the Operator Tally.

| Date | Appointments Scheduled |
|---|---|
| 11/15/2000 | 4 |
| 11/14/2000 | 33 |
| 11/13/2000 | 56 |
| 11/10/2000 | 15 |
| 11/09/2000 | 43 |
| 11/08/2000 | 32 |
| 11/07/2000 | 19 |
| 11/06/2000 | 52 |
| 11/03/2000 | 31 |
| 11/02/2000 | 10 |
| 11/01/2000 | 32 |
| 10/31/2000 | 24 |
| 10/30/2000 | 20 |
| 10/27/2000 | 4 |
| 10/26/2000 | 13 |
| 10/25/2000 | 44 |
| 10/24/2000 | 35 |
| 10/23/2000 | 30 |
| 10/20/2000 | 22 |
| 10/19/2000 | 4 |
| 10/18/2000 | 31 |

FIG. 2an

| | Administrative Tools |
| Session Monitor |
| School Maintenance |
| Messaging Maintenance |
| Attire Maintenance |
| Student Notifier |
| |
| Scheduling Tools |
| New Appointment |
| Find Student Info |
| |
| Reports |
| Summary Report |
| Overview Report |
| School Session Report |
| Schedule Report |
| Schedule Duplicates |
| Operator Scheduling |
| |
| Search |
| By School |
| By Session |
| |
| Account Maintenance |
| Change Password |
| Account Manager |
| |
| Logoff |

Search By School

Enter School ID [ ] [Search]

Select School Name [ Select one ▼ ] [Search]

Portrait School (1)

Your search returned 2 results

| Session ID | Session Start Date | Session End Date |
| --- | --- | --- |
| 1 | Monday, August 30, 1999 08/30/1999 | Friday, September 10, 1999 09/10/1999 |
| 202 (Deleted) | Monday, January 15, 2001 01/15/2001 | Wednesday, January 17, 2001 01/17/2001 |

FIG. 2aq

OurYear(tm) Portrait Scheduling Administration

Address: http://www.ouryear.com/admin/index.asp

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report  Schedule Report
Schedule Duplicates  Operator Scheduling

Search
By School
By Session

Account Maintenance
Change Password
Account Manager

Logoff

Account Manager

Create New Account

| | User Name | Account Name |
|---|---|---|
| [add] [delete] | misty | Misty Myslinski |
| [add] [delete] | jessica | Jessica Woods |
| [add] [delete] | mark | Mark Huff |
| [add] [delete] | eileen | Eileen Bargenis |
| [add] [delete] | Abe | Abe Orlick |
| [add] [delete] | tim | Tim Valecce |
| [add] [delete] | bill | Bill DiGuglielmo |
| [add] [delete] | Kathy | Kathy Hammer |
| [add] [delete] | Esther | Esther Orlick |
| [add] [delete] | nichole | Nichole Schultz |
| [add] [delete] | nancy | Nancy Brady |
| [add] [delete] | kelly | Kelly Tryon |
| [add] [delete] | jacquie | Jacquie Young |
| [add] [delete] | cheryl | Cheryl Russell |
| [add] [delete] | patty | Patty Belezi |
| [add] [delete] | mary | Mary Harshbarger |
| [add] [delete] | cynthia | Cynthia Robinson |
| [add] [delete] | Jerry | Jerry Slane |

Create New Account

FIG. 2ar

OurYear(tm) Portrait Scheduling Administration

Address: http://www.ouryear.com/admin/index.asp

Administrative Tools
Session Monitor
School Maintenance
Messaging Maintenance
Attire Maintenance
Student Notifier Scheduling Tools
New Appointment
Find Student Info Reports
Summary Report
Overview Report
School Session Report  Schedule Report
Schedule Duplicates  Operator Scheduling Search
By School
By Session Account Maintenance
Change Password
Account Manager Logoff Account Manager Username: [mary]
Password: [*****]
Confirm Password: [*****]
First Name: [Mary]
Last Name: [Harshbarger]
Member of Group
Check to Remove          ☐ Operators  ☐ Sales
Available Groups
Check to Add             ☐ Administrators  ☐ Systems

[Edit Account] [Reset] Back

B2

FIG. 2as

OurYear(tm) Portrait Scheduling Administration

Address: http://www.ouryear.com/admin/index.asp

Administrative Tools
Session Monitor
School Maintenance
Messaging Maintenance
Attire Maintenance
Student Notifier

Scheduling Tools
New Appointment
Find Student Info

Reports
Summary Report
Overview Report
School Session Report  Schedule Report
Schedule Duplicates  Operator Scheduling

Search
By School
By Session

Account Maintenance
Change Password
Account Manager

Logoff

Account Manager

Username: admin1
Password: •••••
Confirm Password: •••••
First Name: administrative
Last Name: user Available Groups
Check to Add
☑ Administrators
☐ Operators
☐ Sales
☐ Systems

[Edit Account] [Reset] Back

B2

SCHEDULING SYSTEM AND METHOD INCLUDING CREATING AND/OR CHANGING A SCHEDULING SYSTEM BY AN ADMINISTRATOR AND MAKING APPOINTMENTS EMPLOYING THE SCHEDULE CONDUCTED THROUGH A GLOBAL COMPUTER NETWORK

BACKGROUND

This application is a non-provisional application claiming priority to U.S. Provisional Patent Application No. 60/210,210 filed on Jun. 8, 2000.

The present invention relates to system and method for making appointments and more particularly to a system and method of making appointments through a global computer network wherein an administrator creates a schedule for utilization by users at any location within the network.

SUMMARY

It is desirous to have a system in which appointments can be made by users of a service organization in such a manner as to greatly alleviate, and preferably totally eliminate, human intervention.

For example, let it be assumed that a service organization, such as, for example, a dental services organization having a rather significant size of clientele, provides appointments for its clients.

One typical approach is for clients to make appointments at the office through a member of the staff who manually inserts the appointment particulars in an appointment book or, possibly, a computer. Alternatively, appointments can be made via telephone whereby the staff member, at the called office fielding the telephone request, enters the appointment particulars within the appointment book or computer.

These techniques necessitate human intervention of the staff and therefore require presence of a staff member in order to obtain and enter the necessary particulars. Requests for changes in the schedule made by clients necessitates human intervention to enter in the new appointment particulars as well as removal of the original appointment particulars previously made by the client. In addition, errors may occur in the entry of the appointment particulars by the staff member and, in the case of a telephone request for an appointment there is no guarantee that a client has made an entry notation or other reminder at the client's end of the appointment schedule.

Although the staff member taking down the appointment particulars may send a letter or facsimile to the client, this necessitates a further extra step on the part of the staff.

Likewise, in situations where the appointment is taken at the office, although an appointment card can be handed to the client, this likewise necessitates an additional manual step being performed by the staff member.

In addition to the above, many offices accept and make appointments only during normal business hours.

Therefore, it becomes extremely advantageous to provide an appointment system and method in which schedules are created by a service operation and made available to clients or other designated users through a global computer network.

The present invention is characterized by comprising a system and method for scheduling appointments in which the party administering the schedules has the capability of creating a schedule and providing it for presentation on a global computer network, such as the Internet.

Designated users, such as clients, customers or the like, gain access to a web site at which the schedule or schedules may be viewed.

Designated users are assigned a password enabling a designated user to view the schedule or schedules.

The designated user then peruses the schedule, selecting an appointment date or time and entering in the pertinent information identifying the designated user. During entry, the designated user views the data being entered and may simply correct this data in the event that an incorrect entry is made. Upon review of the appointment particulars identifying the date and time of the appointment as well as identifying the designated user, the designated user places a cursor upon the entry button and clicks the entry button to enter the correct data.

The schedules may be accessed simultaneously by a number of different designated users and the designated users may visit the web site and view the schedule and their appointment particulars at any time. In addition, a hard copy record may be made of the appointment particulars simply by printing a hard copy of the appointment particulars, as permitted by the system.

The nature of the global computer network is such as to enable designated users to access the web site and the schedule after normal business hours and more particularly at any time of the day and at any time of the week be it a workday, weekend or holiday, thus greatly facilitating the use and efficiency of the system.

The system also provides information for the designated user to prepare the user for the appointment the nature of the service, i.e., taking x-rays, periodic check-up, etc. Once the designated user has selected an available date and time and has entered his (or her) correct personal data (including e-mail address), the system automatically sends an e-mail reminder to the designated user prior to the appointment date. The administrator also has the capability of providing messages important or otherwise) on the screen employed by the user, which can aid in preparing the user for the appointment or to advise of snow emergencies, for example.

The system administrator may review the schedule to determine, for example, if it is necessary to modify the schedule such as by shortening it or lengthening it, by changing the allotted appointment times, and so forth. The administrator may also review the entries to assure that designated users are not making more than one appointment for a given activity.

It is therefore one object of the present invention to provide a system and method for facilitating and simplifying the making of appointments, substantially reducing if not eliminating human intervention by the administrator.

Still another object of the present invention is to provide a novel system and method for making and recording appointments through a global computer network.

Still another object of the present invention is to provide a novel system and method for recording appointments in a substantially automated manner and which is adapted to enable a number of designated users to simultaneously gain access to the appointment system.

BRIEF DESCRIPTION OF THE DRAWING(S)

The above as well other objects of the present invention will become apparent when reading the accompanying description and drawings, in which:

FIGS. 1a–1f are screens for use by the designated user, i.e., student. The information available in these screens is entered into the system by one or more of the four (4) user levels, using the screens in FIGS. 2a–2as.

Figure 2A:
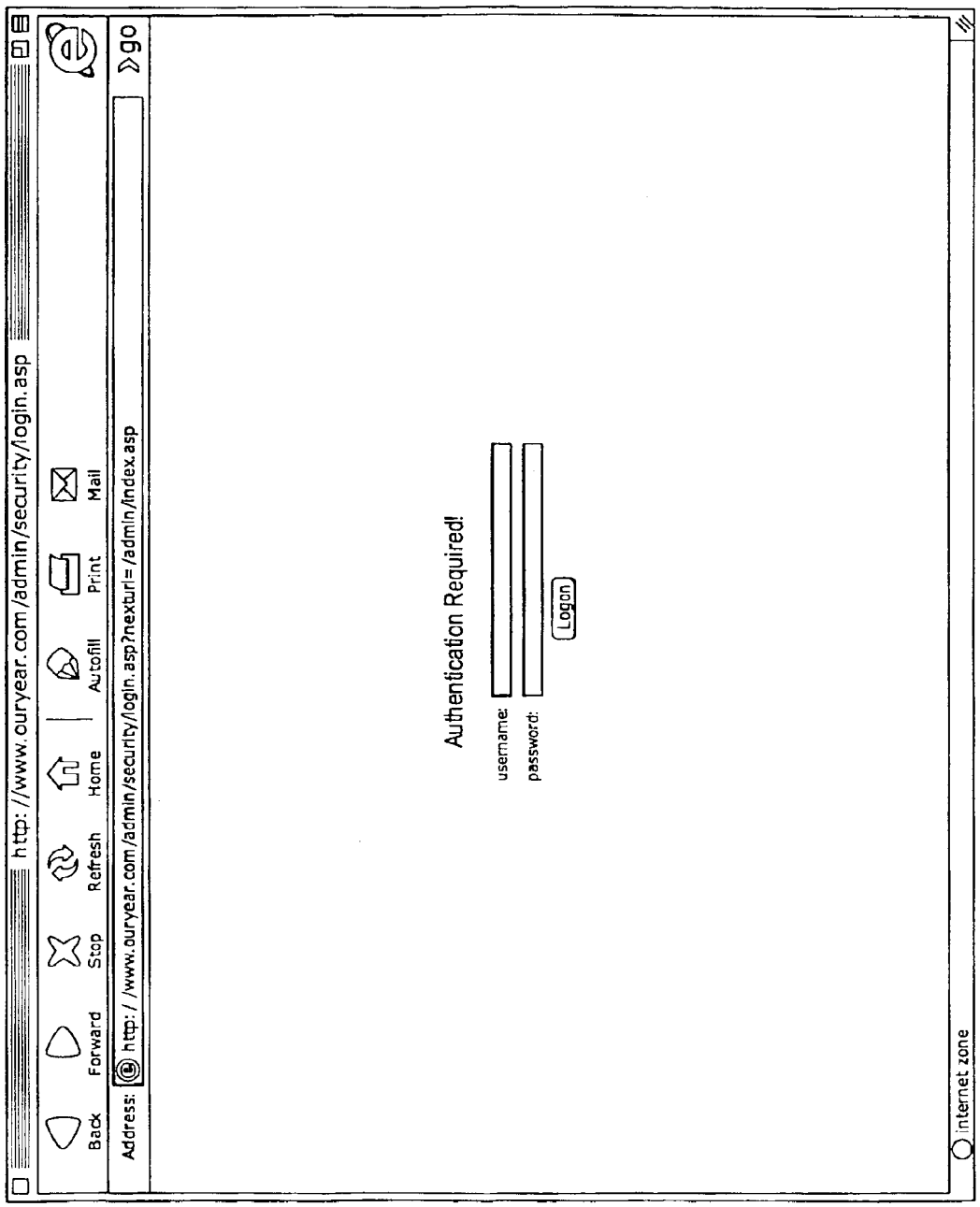

FIGS. 2a–2as are screens for the users, other than students, which are used to set up the system and manage the data base.

Figure 3:
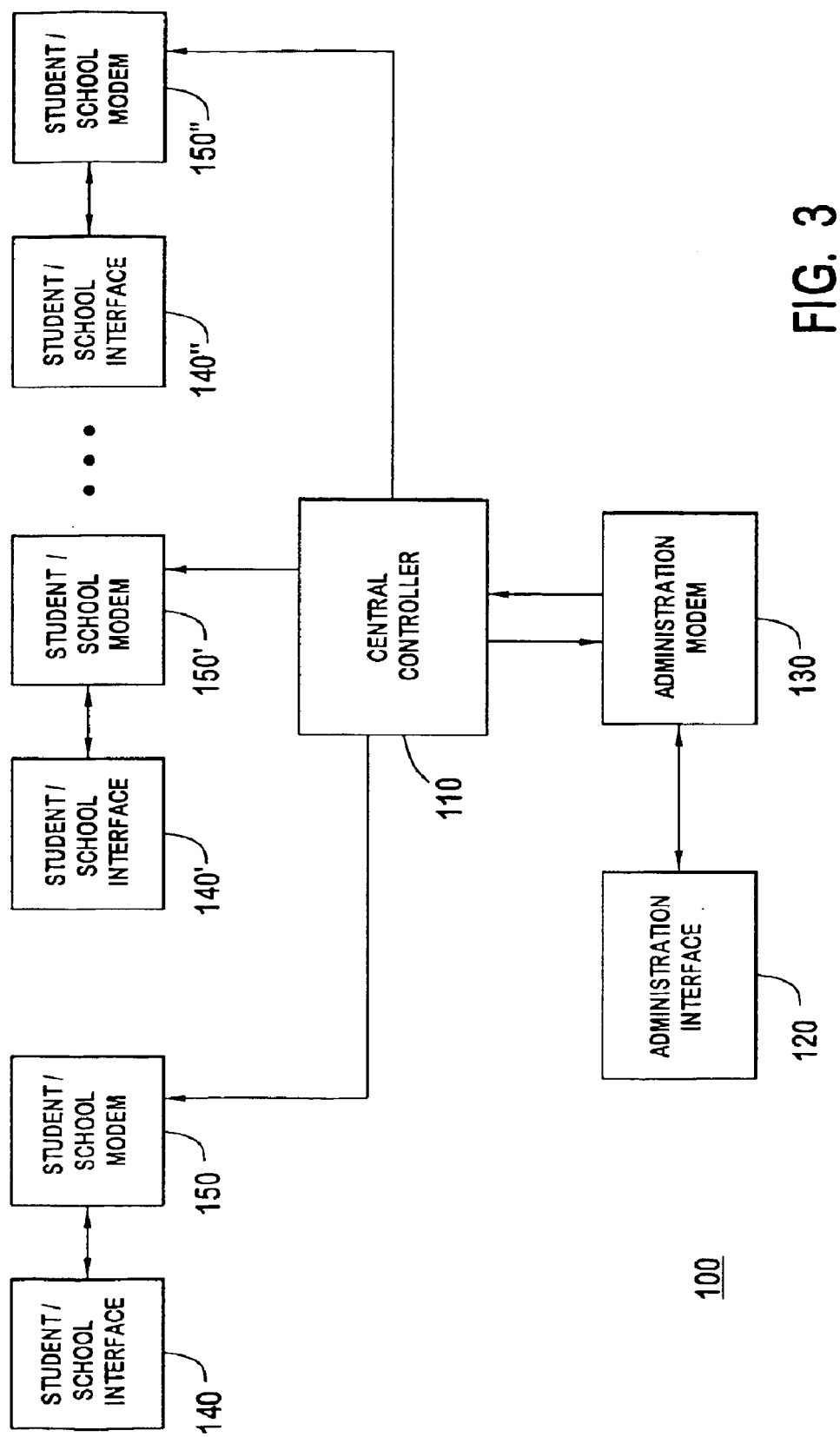

FIG. 3 is a simplified block diagram showing a type of a global computer network in which the system and method of the present invention may be utilized.

Figure 4:
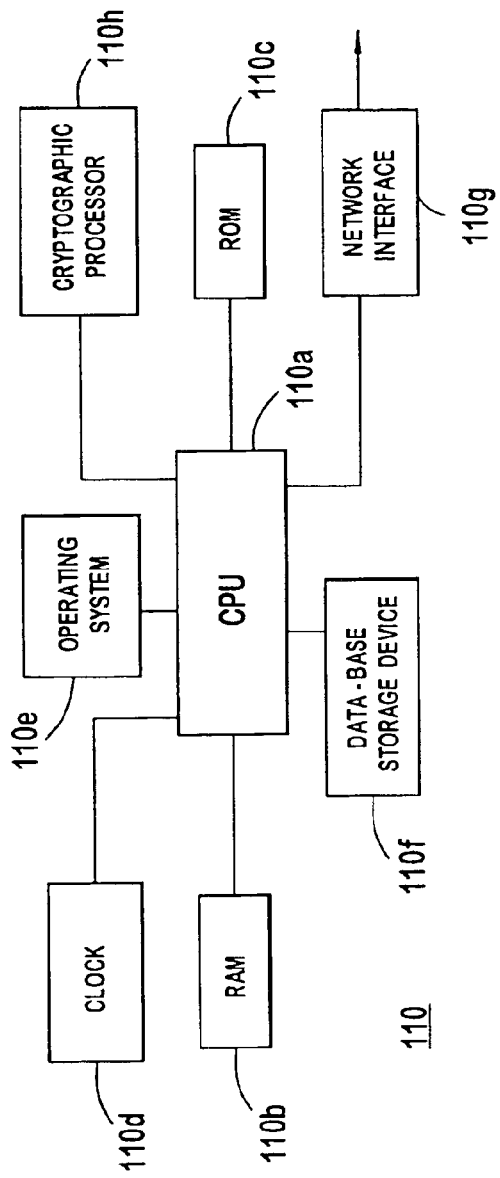
Figure 5:
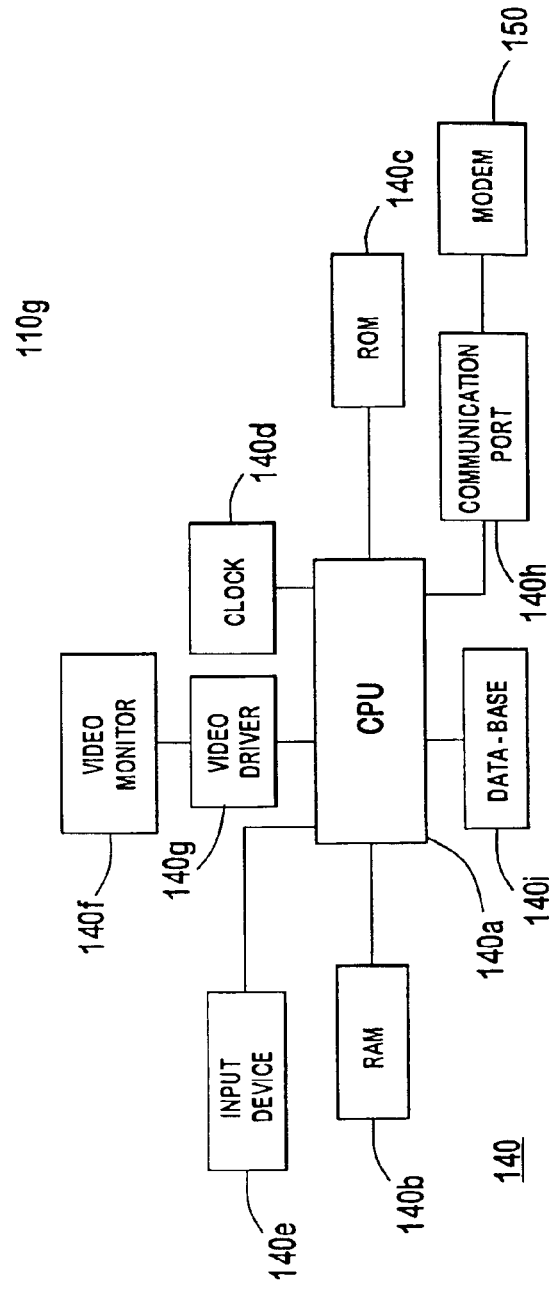
Figure 6:
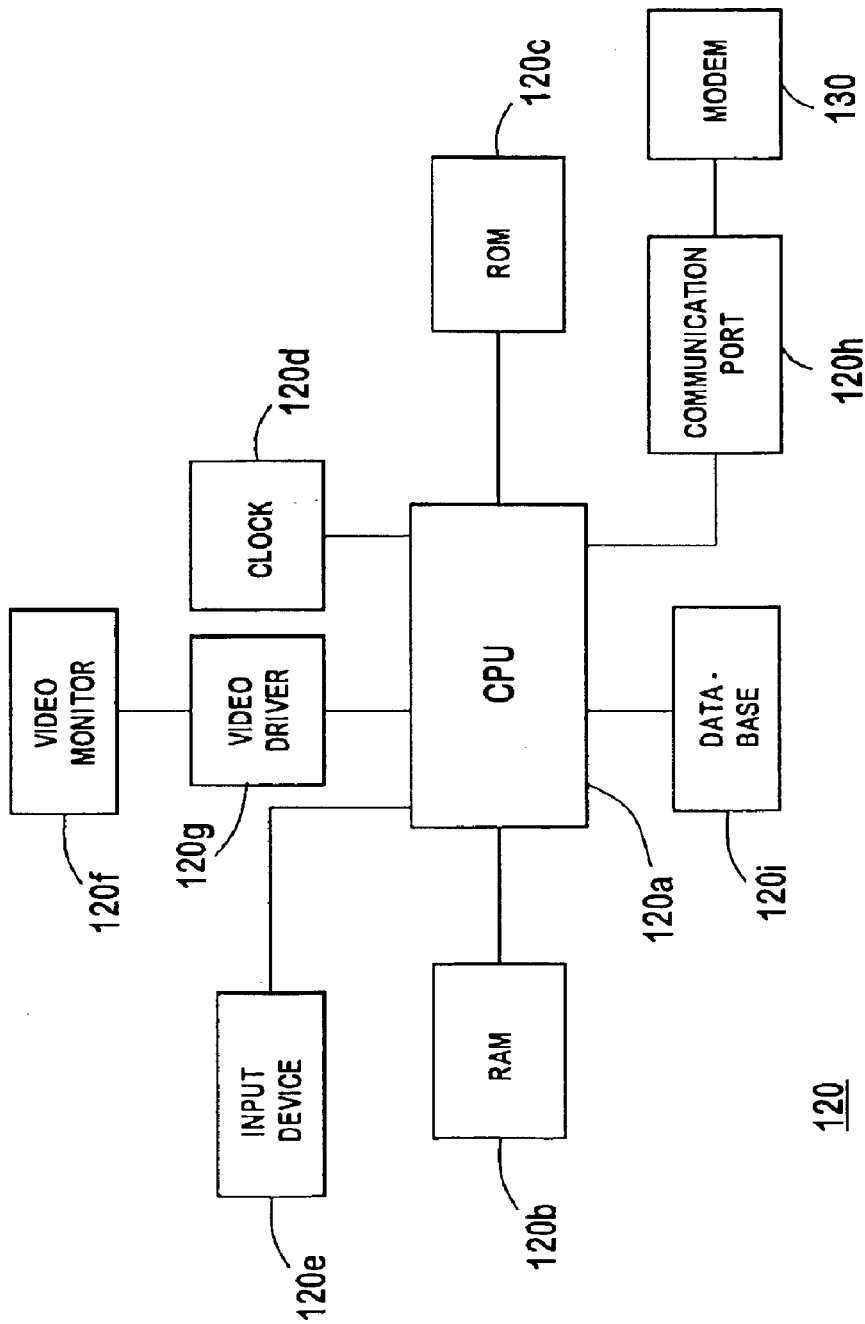

FIGS. 4, 5, and 6 are block diagrams showing the central controller, administrative interface and student/school interface in greater detail.

Figures 7, 7A:
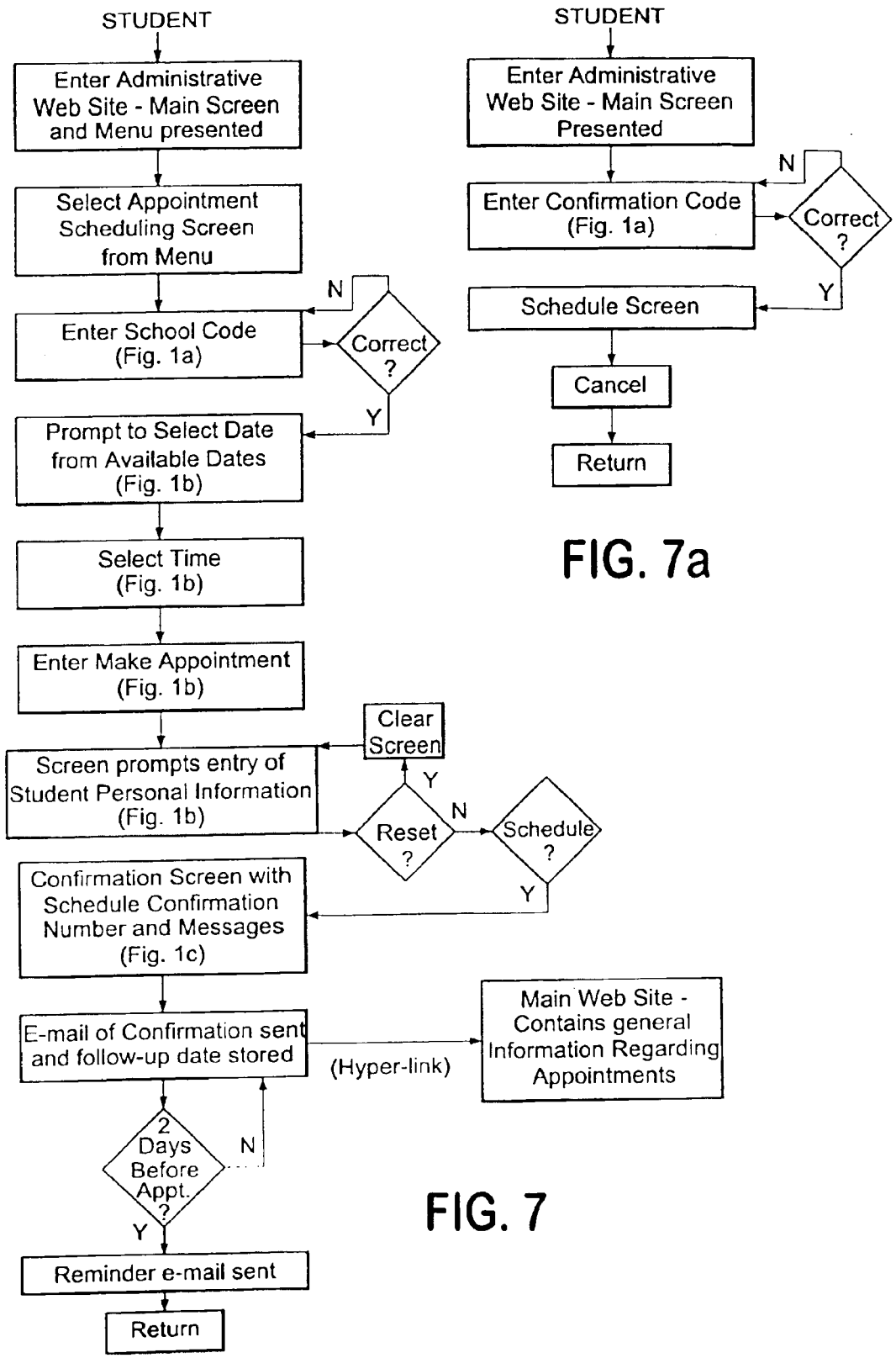
Figure 8:
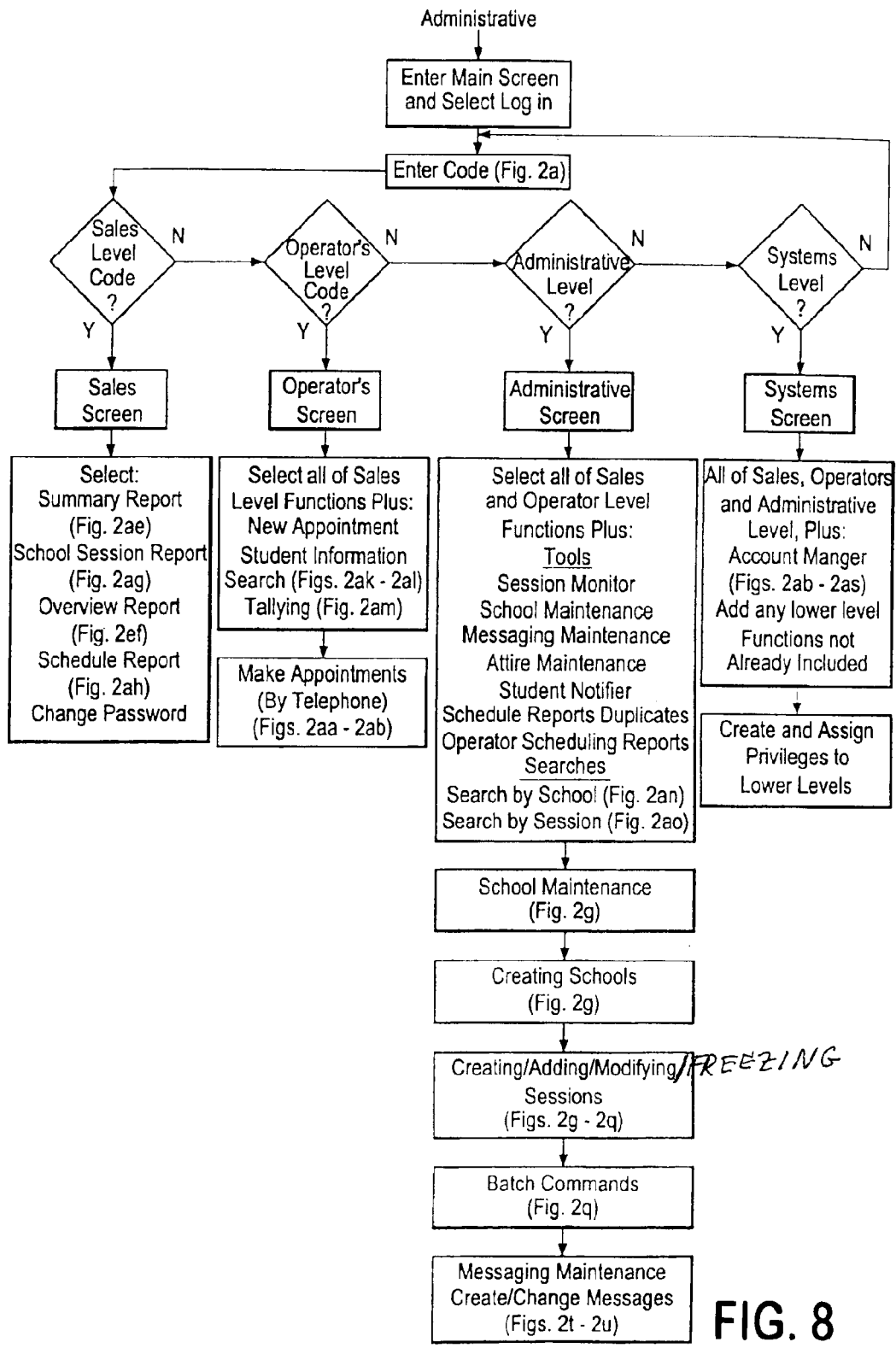

FIGS. 7, 7a and 8 are flow diagrams respectively showing the program steps of the student/school program and the administrator program.

DETAILED DESCRIPTION OF THE PREFERRED EMBODIMENTS

The appointment system to be described hereinbelow is one in which there is provided a web site accessible through the Internet, for example, by designated users for the purpose of scheduling appointments for portrait sittings. However the system may be used for many other applications or fields where it is desirable to provide an efficient scheduling system.

In the preferred embodiment to be described hereinbelow, it is assumed that the system and method of the present invention has been adapted for use by a school photography studio desirous of providing a system for scheduling sittings for pictures and/or portraits of students in a graduating class which may be part of a high school, college or post graduate class.

It is further assumed that the graduating class may have as many as ten thousand (or more) students in the graduating class, necessitating the provision of a rather extensive schedule. However, the scheduling system may be utilized for larger or smaller groups.

FIG. 3 shows a simplified block diagram of a computer network 100, which can, for example, be a global computer network and, which, in the simplified block diagram of FIG. 3 is comprised of a central controller 110, an administration interface 120 and an administration modem 130 as well as a plurality of student/school interfaces 140 and modems 150, coupling the student/school interfaces to central controller 110.

For the purpose of explaining one preferred embodiment, it will be assumed that the administrator is a studio which produces photographs for high schools, colleges, universities, and the like and which, in the unique manner described herein, utilizes the internet to provide a capability of scheduling appointments twenty-four hours a day, seven days a week, which was not heretofore easily obtainable through conventional methods.

Further for the purpose of describing the present invention, it will be assumed that the school involved has more than five thousand students (although it should be understood that the present invention may be used equally well with a greater or lesser number of students), which students may need to schedule appointments for one or a number of photographs, such as photographs of sports teams, club members, school events, candid shots of students and class trips, to name just a few, as well as the conventional section of the graduating students which include a photograph (i.e. "portrait") of each student and a student's biography.

It is further conventional in such graduation yearbooks to set forth a uniform policy with regard to the pictures, such as portraits, of members of the graduating class. For example, with regard to a military institution, all of the graduating seniors may be obliged to sit for their portraits in full uniform. This may be true of other institutions which, although they are not military institutions, normally require students to wear a uniform or other standard dress to class. It is also possible that the adopted policy is that all male students sit for their portraits wearing formal attire or wearing a "suit and tie". In all-girls schools or coed schools all of the graduating females may be required to wear a given type of clothing.

In the example given, where more than five hundred students are required to sit for their portraits, the system administrator, in accordance with the present invention creates a schedule provided through the computer network, to the student body to facilitate an orderly scheduling policy and procedure. The web site displaying the schedule may be created by any conventional means presently in use for creating a web site and its contents.

Each of the interfaces 120 and 140 may be connected via an Internet connection using a public switched phone network, for example, such as those provided by a local or regional telephone company.

Connections of the interfaces 120, 140 with one another may be through T1 lines, DSL connections, cellular phone systems, wireless PDA's, dedicated data lines, microwave or satellite networks or any other communication means presently utilized for connecting interfaces within the network.

The present invention utilizes the above-mentioned components to provide a novel method and apparatus for simplified efficient and orderly scheduling of appointments.

The administrator, upon establishing a working arrangement with a given school, creates a schedule, such as, for example, the schedule shown in FIGS. 2q, 2r.

The central controller 110, as shown in FIG. 4, comprises a central processor 110a, RAM 110b, ROM 110c, clock 110d, operating system 110e, data base storage device 110f and network interface 110g. The CPU 110a may be any suitable computer such as a PC or a computer work station with sufficient memory and processing capability and may operate as a web server receiving and transmitting data between the administrator and the student/school interfaces. The CPU 110a is chosen so as to be capable of high volume transaction processing and is able to perform a significant number of calculations in processing communications and database searches. A Pentium microprocessor such as a 500 MHz Pentium III processor manufactured by Intel, Inc. may be utilized. Any other suitable processor having similar or greater capabilities and capacities may also be utilized.

The program itself provides user authentication, at the web server/CPU 110. The routine which checks user authentication is part of the database itself, and not hardware dependent. The computer doesn't need any special equipment for this authentication to take place.

The data base 110f serves to store all of the scheduling information for each of the schools, it being understood that the administrator may be scheduling sittings for a number of different institutions or schools. The data base 110f maintains data on the students which include name, address, telephone number, e-mail address, and the like.

Network interface 110g serves as the gateway for communication between student/school locations and the administrator. Conventional internal or external modems may serve as the network interface. The network interface preferably supports modems through a range of baud rates and may combine such inputs such as T1 or T3 line if more band width is desired. In a preferred embodiment, the network interface is connected with the internet and/or any of the commercial on-line services such as America Online, Compuserve, Erols or the like, allowing students/schools and administrators access from a wide range of on-line connections.

While the embodiment described hereinabove teaches the use of a single computer acting as a central controller, those skilled in the art should understand that such functionality can be distributed over a plurality of computers which may connected through a local area network (LAN) or wide area network (WAN).

FIG. 5 and FIG. 6 show a student interface 140 and the administration interface 150, respectively. Both interfaces may be conventional personal computers (PCs) which include an input device such as a keyboard and/or a mouse, a display device such as a monitor, a processing device such as CPU, and a network interface such as a modem, the student/school and the administrator interfacing with the central controller 110.

More specifically, the student/school interface includes a CPU 140a, RAM 140b, ROM 140c, clock 140d, an input device 140e which may be a keyboard and/or a mouse and a video monitor 140f coupled to CPU 140 through video driver 140g. The administrator interface communicates through modem 150 coupled to CPU 140a through communications port 140h.

Data storage device 140i may be a hard disk storage unit for recording communications with the central controller 110.

The administrator's interface 120, shown in FIG. 6 is substantially similar to the interface 140 shown in FIG. 4, wherein like components are designated by like alphabetic numerals, the individual components each being identified as 120a through 120i, respectively.

There are many commercial software applications that can enable the communications required between student/school and administrator interfaces the primary functions being message creation and transmission. When the central controller is configured as a web server, conventional communication software such as the Internet Explorer Web Browser from Microsoft or the Netscape Navigator Web Browser from AOL may also be used where transmissions between student/school do not require proprietary software.

In the embodiment shown, communications between student/school interfaces and the administrator interface utilize electronic networks with the central controller 110 acting as a web server.

The administrator logs on to the central controller to create a schedule, the central controller acting as a web server. The administrator may then disconnect from the network. In the preferred embodiment, the systems level administrator level, sales representative level and operator level have different access to the schedule, as will be more fully described, each being provided with an upper level, middle level and lower level access code assigned to these four categories of users. Certain portions of the schedule are thus denied access to certain categories of users.

An outline of the four (4) levels and their functions are as follows:

(a) The "sales level login allows the sales staff to track session attendance at schools. They are not limited in which schools they can track.

(b) The "operator" level login allows operators to schedule portrait appointments. It also allows administrative users to track the calls taken that result in a scheduled appointment, and to track which operator scheduled the appointment. Operators also have some search functions.

(c) The "administrative" level login allows for the creation and deletion of schools, sessions, attire, and text message information. Administrative level users have all available search and report functions. Administrative level users also have access to student email addresses and the mail utility.

(d) The "systems" level login allows the MIS department or other designated individuals to create and manage accounts for all levels of user. System level users can have access to all other levels, or can be limited to account creation. A system level user can determine what access the other levels are entitled to.

A student desiring to schedule an appointment may log on to the central controller through any computer capable of interfacing with the electronic network which may be a computer at the school, college or other institution attended by the student, or any other computer capable of logging on to the network. The central controller has a page on the World Wide Web, allowing the administrator to provide information in the form of the schedule through the interface of conventional web browser software such as Netscape Navigator.

FIG. 1a is the first screen that the student visits upon reaching the administrator's web site. In order to gain access to the schedule, the student has one of two options:

In the event that this is the first time that the student is logging on to the web site to schedule an appointment, the student enters the school ID Code. This is given to the school by the administrator through some secure means. The school then provides each of the students with the school ID Code.

In the event that the student wishes to check the schedule date and time for a previously scheduled appointment, the student enters a confirmation number which is created in a manner set forth hereinbelow.

The student employs the input device of the student/school interface, such as a keyboard, to enter the school ID, which appears in the window W1 of FIG. 1a, if this is the first time that the student wishes to schedule an appointment.

In the event that the student wishes to check a scheduled date and time for a previously scheduled appointment, the student enters a confirmation number in window W2 shown in FIG. 1a. Alternatively the student can cancel a scheduled appointment when going to the confirmation page.

The student checks the ID which has been entered, or confirmation number, and clicks on the Schedule button if the number is entered correctly. If the number is entered incorrectly, the student deletes the code entered and corrects the number entered. If the school does not have an appointment schedule, clicking on the Schedule button redirects the student to error.asp (error. "active server pages") to display the appropriate error message, such as "No Appointment Schedule". It should be understood that the ID code and confirmation "number" may be alphabetic or numeric characters or a combination thereof.

In order to schedule an appointment, the screen shown in FIG. 1b appears. The student is prompted to select a date ("Step 1"). The up/down arrows to the right of the "date" window change the date displayed. The "Get Available" times is then clicked.

The student clicks the button marked "Get Available Times" to choose the day. "Currently available days" are those days during a session where at least one appointment still exists unscheduled. This can change as the administration adds or removes more times to the day.

Once the student has chosen the date, the second frame on the page prompts them to choose a time from the list of times currently available (Step 2). If there are no acceptable times, the student can click back into the first frame to choose a different date. If the students choose another day, the date selection frame refreshes after they click the "Get Available Times" button.

When the student chooses a time by clicking on the "make appointment" button, the third frame then prompts the students to fill in their name, telephone numbers, and email address to reserve their time (Step 3). They must also indicate whether or not they have been photographed before. They must click on the "Schedule It" button to commit their information to the database. They also have the option of clicking "Reset Fields" to erase their information from the third frame. At any point before clicking "Schedule It" the student may choose a different date or time by clicking into the appropriate frame.

Once the students click the "Schedule it" button the system returns a confirmation page with the student's confirmation number, date and time of their appointment, location of the portrait sitting, the proper attire for the sitting, and any applicable fees (FIG. 1c). This confirmation is also immediately e-mailed to the student. The confirmation is also resent as a reminder to the student, preferably two days before the appointment although the number may be changed to suit the particular application. Finally, the student clicks on the "Confirm" button near the bottom of the confirmation screen to take the student out of the scheduling system and links to a Portrait Sitting Hints page on the company website, by a hyperlink. The information on the company website may also be selected to suit the application.

Students can look up their appointment at any time by entering their confirmation number into the labeled text box on the front page FIG. 1a.

A student can remain on a day screen indefinitely. However, when a student clicks on a select time but does not select the time within 10 minutes, when the time is selected after time out, the student is returned to the screen of FIG. 1a.

Figure 1F:
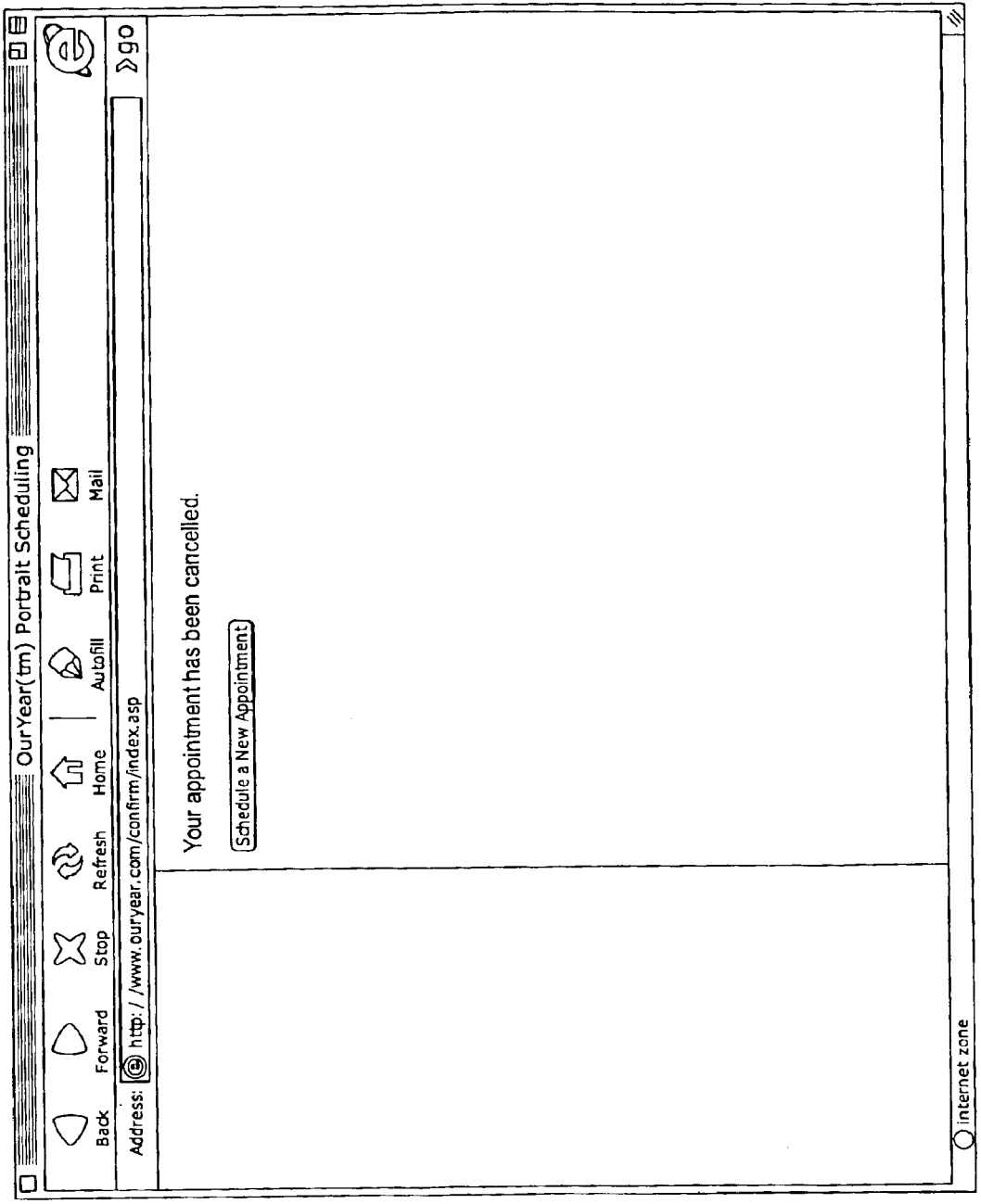

To cancel or reschedule their appointment, they can click on the "Cancel Appointment" button on the resulting confirmation page (FIG. 1d) and are prompted to confirm the deletion of their appointment (FIG. 1e). Finally, the deletion is confirmed, and if they wish to reschedule, they can click on the Schedule New Appointment button to start again (FIG. 1f).

The program automatically stores the appointment date and time in a data base together with an indication that the appointment date and time is "taken", and generates a confirmation number and, in addition to presenting the school, date and time of the sitting, sets forth the attire and location of the sitting and any fees involved. The program generates a reminder e-mail with the above information, sent automatically to the student at the e-mail address provided by the student, at least at the time that the confirmation is provided to the student as well as a given time before the sitting (two days before, for example), as was set forth above.

As was mentioned hereinabove, the student may also enter his or her confirmation number in the window W2 in FIG. 1a in order to check the scheduled date and time and/or to cancel a scheduled appointment.

A user at any of the four (4) levels described above gains access to the system at the user end by entry of a user ID and a password as shown in FIG. 2a. After entry of the user name and password, typically by a keyboard, the user clicks on the Logon button, moving the user to the next screen. In the event that any of the information was incorrectly entered, the user deletes the incorrect data and enters the correct user name and/or password.

By clicking on Logon, the operator, sales and the administrator or system user screens are provided according to the level to which the user is entitled to have access.

Figure 2B:
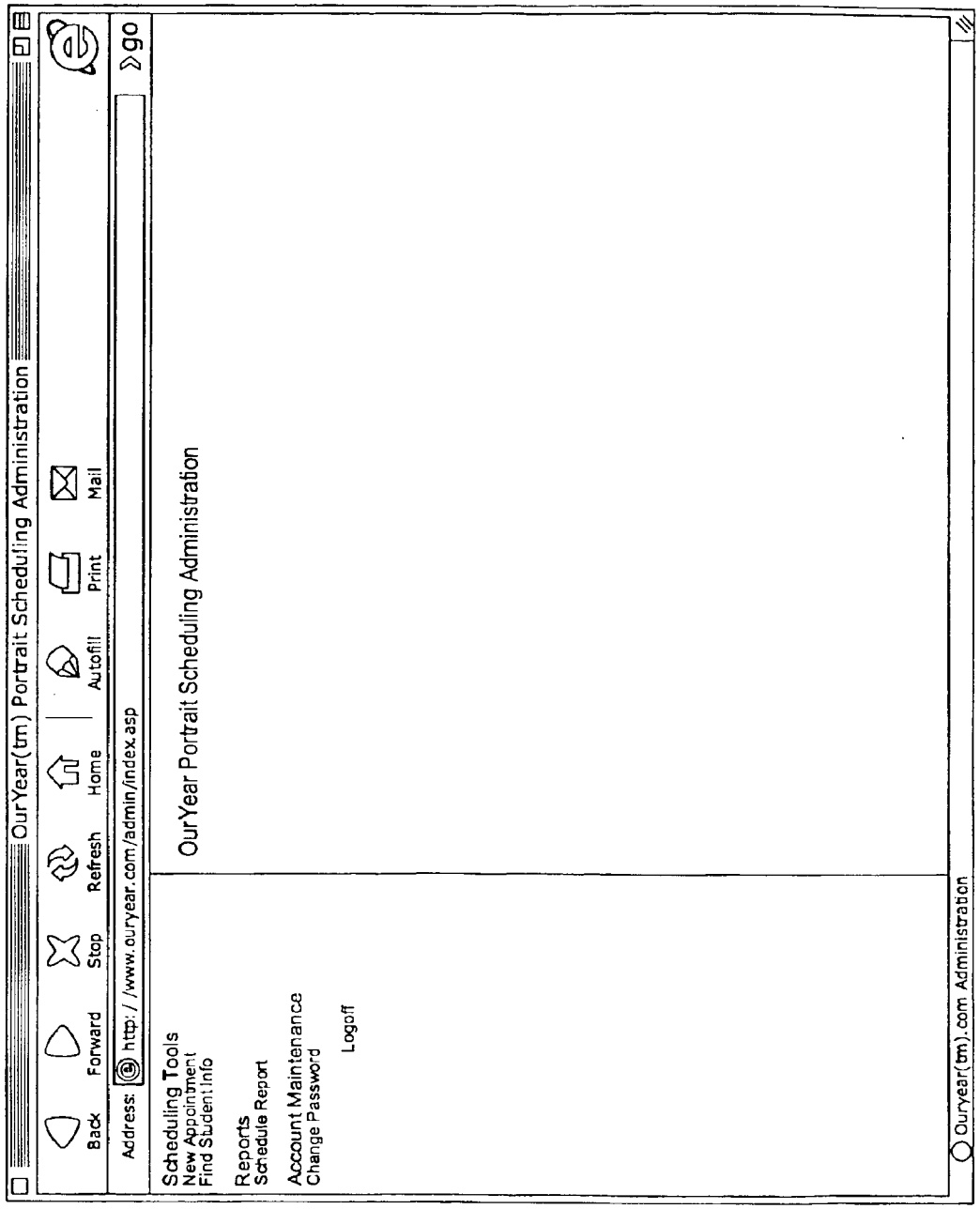

For the sales interface:

1) Upon successful login, sales users are presented with the standard user frameset (FIG. 2b). The menu of available options for the Sales Level login appears in the left-most frame. The results of each function appear in the right-most frame.

2) Sales level users have access to the following reports:
 (a) Summary Report
 (b) School Session Report
 (c) Overview Report
 (d) Schedule Report 3) Sales users are not restricted to their own school accounts. They may enter any school number and view reports for any school.

4) Every user may change his or her own password at will.

The Operator Interface

The operator level login provides operators with access to specific administrative functions, as well as allowing operators to schedule appointments for students who call an "800" number, such as the 1-800-OUR-YEAR(tm) hotline, without having to log out of the administrative site. The operator login includes a tracking feature which tallies the number of completed appointments per operator.

While the login itself is associated with several specific functions, operators are also given access to sales level functions. These functions stack, and if both levels have access to a particular function, it only lists once on the menu.

Figure 2C:
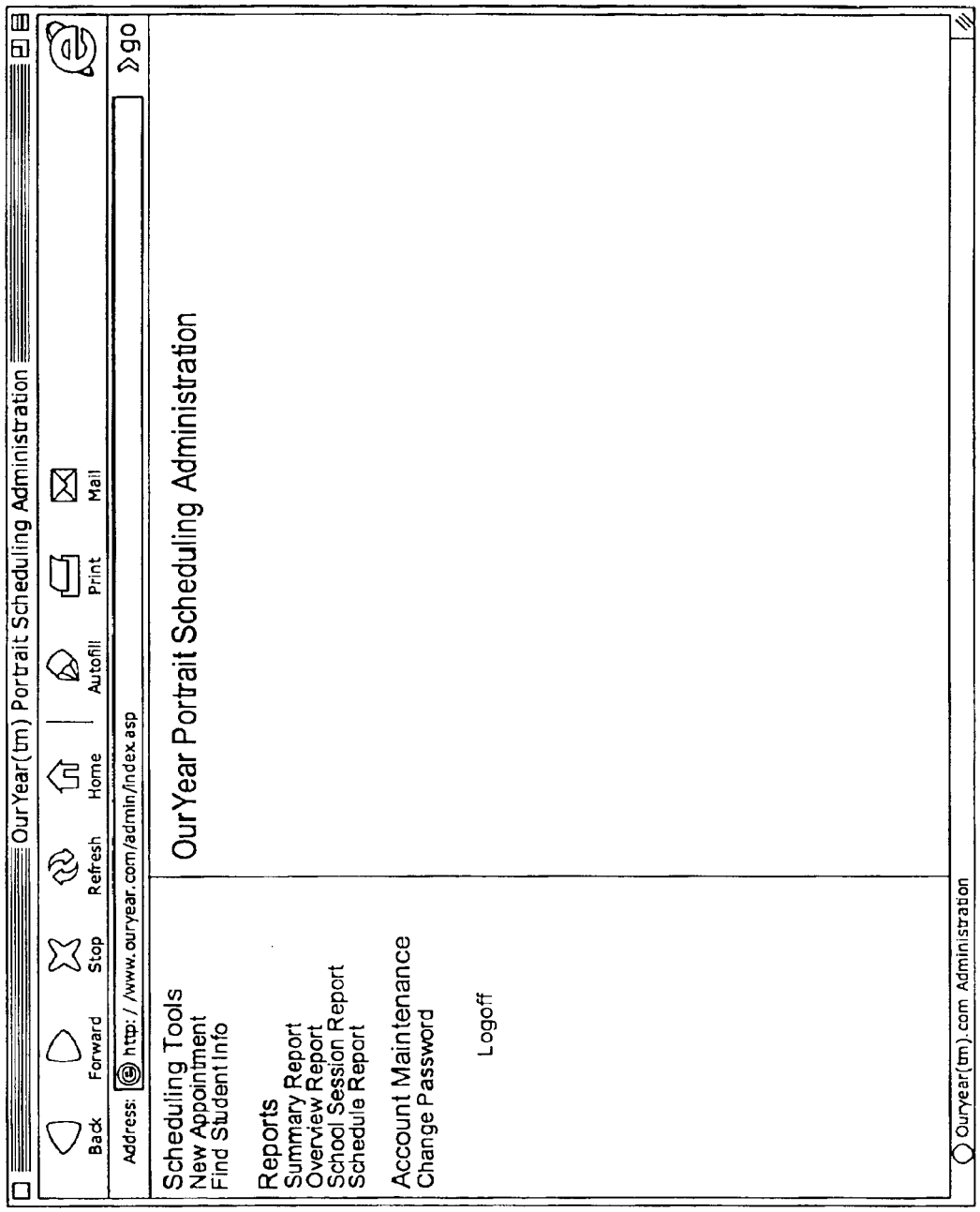

The following details the process the operator users undergo upon login:

1) Operators log in and tally begins. Upon successful login, operators are presented with the standard user frameset. The menu of available options for the Operator Level login appears in the left-most frame (FIG. 2c). The results of each function appear in the right-most frame. Since Operators are also given access to sales level functions which have been previously discussed, only those functions unique to the operator level are discussed here.

2) The base operator level login includes the following functions:
 a) Scheduling Tools
  1) New appointment
  2) Find Student Information (search)
 b) Reports
  1) Schedule Report 3) Tallying takes place only for scheduled appointments. If the student elects not to complete the appointment, the tally is not updated. Each time an operator logs out during the same calendar day, the tally value is stored in a date-linked field. If the operator logs in again on the same date, the tally does not reset, but continues to increment from the previous value.

The Administrative Interface

Administrative users are responsible for setting up schools and sessions within the system, and also handle any kind of messaging or student notification outside of the automated appointment Confirmation e-mails.

While the login itself is associated with several specific functions, Administrators are also given access to operator and sales level functions. These functions stack, and if all levels have access to a particular function, it only lists once on the menu.

The following is the process the Administrative users undergo upon login:

1) Administrators log in and tally begins. Upon successful login, Administrative users are presented with the standard user frameset (FIG. 2d). The menu of available options for the Administrative Level login appears in the left-most frame. The results of each function appear in the right-most frame. Since Administrators are also given access to Operator and Sales level functions which have been previously discussed, only those functions unique to the Administrative level will be discussed here 2) The right-most frame defaults to the Session Monitor for Administrative users (FIG. 2e). The Session Monitor periodically checks the database and alerts the administrative users if a session is filling up-less than 50 appointments left, etc. Administration users are able to identify trouble spots quickly and make decisions based on the most accurate data available at the time.

3) Administrative level users have access to the following functions, discussed in detail below.

a) Administrative Tools
    1) Session Monitor
    2) School Maintenance
    3) Messaging Maintenance
    4) Attire Maintenance
    5) Student Notifier
  b) Reports
    1) Schedule Duplicates Report
    2) Operator Scheduling Report
  c) Searches
    3) Search by School
    4) Search by Session
    4) The tally functions as it does for operators.

The Systems Interface

The Systems level user can manipulate accounts at will.

1) Upon successful login, systems users are presented with the standard user frameset (FIG. 2f). The menu of available options for the systems level login appears in the left-most frame. The results of each function appear in the right-most frame.

2) Systems level users have access to the following:
  a) Account Maintenance
    1) Change Password
    2) Account Manager 3) Systems level users can add other level functions to their own at any time.

The variety and flexibility of functions provided by the method of the present invention allows both student and internal "users" every advantage possible to make scheduling appointments and creating schedules as easy as can be. The system is robust enough to prevent most errors from occurring, and allows for easy retrieval of information in case of a question.

The functions available to Student users have been previously discussed. The functions available to internal users are set forth hereinbelow.

As user levels can be combined, rather than discuss each function according to the native user level, functions will be listed in the order in which they would appear on the internal menu to a user having access to all functions. In theory this would be a superuser; in practice, however, this represents the abilities of a Systems level user.

Administrative Tools

The administrative tools are:
  1) Session Monitor
  2) School Maintenance
  3) Messaging Maintenance
  4) Attire Maintenance
  5) Student Notifier Session Monitor The Session Monitor (FIG. 2e) periodically checks the database and alerts administrative users if a session is filling up. The monitor lists active sessions by School ID, Session ID, Start Date, End Date, Open Buckets, Locked Buckets, Scheduled Buckets, Total Buckets in the Session, and the percentage of Utilized buckets. This refers to the number of buckets scheduled from the total buckets created. In any session in which there are fifth or fewer open buckets, the number of open buckets is preferably displayed in a distinctive color, such as red. A bucket is defined as a 15 minute sitting period.

School Maintenance Main Screen

The School Maintenance screen set functions as a single, unified guide to any information available about a school. On the main School Maintenance Screen (FIG. 2g) administrators may select the school from a list of schools, or may enter the school number. They can also add a new school to the data base.

To create a school, the user enters the school number (ID), school name, and any applicable URL information in the labeled text boxes, and clicks on Add School. Note that while the information is being communicated to the database, the button's label reads "Transmitting," so that the user remains aware of the system's progress (FIG. 2h). The information is committed to the database, and can be retrieved by entering the school number or selecting the school from the pull-down menu of available schools. One a school has been created, the Add School button changes to Update School for the school.

To retrieve school information already created, the user can choose the school using the pull-down menu of available schools, or the user can enter the school number in the selection box (FIG. 2g). In both cases the user clicks on the "Get School Info" button to retrieve the information. All of these tools are located in the bar B1 at the top of the right-most frame. Bar B1 allows the user to enter any school without having to go out of the system and then log back in.

To change previously entered information, the user clicks into the labeled text box, makes the corrections, and clicks on the Update School button (FIG. 2i) The Reset Fields button can be used to quickly erase any information in the text boxes, however, Update or Add School must still be clicked on to save any changes.

Also on the School maintenance screen (FIG. 2g) are the Active Session Information and Deleted Session Information boxes, which allow users to manipulate sessions already created for the school. If there are no active sessions, the text box will display a message to that effect.

The Active Session Information box has four associated buttons: Modify Session, Extend Session, Delete Session, and Create Session. Modify Session allows a user to change information relevant to a user to change information relevant to a particular portrait session. Extend Session allows a user to add more days to a session both before and after the current start/end dates. Modifying and extending sessions will be discussed in more detail. Delete Session will remove student access from the selected session. The system will confirm the deletion and the session information will then be listed in the Deleted Session Information box (FIG. 2i). None of the Modify Session, Extend Session and Delete Session buttons can be used until a session has been created. Create Session is the only one of the buttons that does not require the user to select information in the Active Session Information box.

The Deleted Session information box has two associated buttons, Restore Session and Hard Delete (FIGS. 2g, 2i). Clicking on Restore returns the session to the Active Session Information box, and allows students to access that session if it is the most recently created session (FIG. 2j). Hard Delete permanently removes the session and all associated records from the database.

The system also provides for the deletion of schools by clicking on Delete School, which permanently removes the school and all associated records from the database The system will prompt the user for a confirmation before deleting (FIG. 2k).

Session Maintenance Main Screen

Once a school's information has been entered into the database, the user can create the session—the set of dates and times during which a photographer will be at the school to photograph portraits. Multiple sessions are preferably created for a single school, giving students at least two opportunities during the year in which to have their portraits done. The most recently created session is the "active" session: that is, the most recently create session is the one that students will access when attempting to schedule their portrait sitting.

To create a session, the user enters a school number on the School Maintenance screen (FIG. 2g). Once the school information displays, the user clicks on the Create Session button which is linked to the main Session Maintenance Screen (FIG. 2l).

In the Session Maintenance screen, bar B1 changes to reflect the new function. The user uses the pull-down menu to return to the School Maintenance screen for any school. Clicking on Create New Session in bar B1 blanks the information already on the screen, and allows the user to select a new school from the labeled pull down menu on the lower part of the screen. This avoids the need for users to return to the School Maintenance screen to create a session.

To create a new session, the user indicates the location. If this is the first session at the school, there will be no locations listed in the pull-down menu. The user must create the first location by clicking on New Location. A pop-up window appears, containing a text box into which the user types the Location information (FIG. 2q). Clicking on Create Location in the pop-up window commits the location information to the database. The user may create more than one location. The final location created becomes the default location for the session. Location changes are performed in the Session Day Maintenance Screen, and will be discussed in the Modifying Session Days section.

Once the user has created and selected the default location for the session, the user must indicate the school year, starting and ending dates of the session, the fees and their descriptions and the attire for male and female students (where applicable). Creating attire descriptions will be discussed below in greater detail. The user must also indicate whether or not the Java-banner Session Warning should run, the default start and end times for the session, the number of buckets (available appointments per 15-minute period), and whether or not Saturday appointments will be available.

The dates and times can be entered manually or can be selected from pop-up calendars (FIG. 2m) and clocks FIG. 2o). Clicking on the icon beside each labeled text box will bring up the appropriate tool. The user can select the date or time in that tool, and click on Okay to have that date or time entered into the text box.

Once this information has been entered, the user clicks on the Create Session button at the lower right corner of the screen (FIG. 2n) to commit the information to the database, and assign a Session ID to that set of days. Reset Fields will erase all information from the labeled text boxes. It will not erase attire or location information.

This process will set-up a bare-bones session. Specifics of each day must still be entered. Once the session has been created, the user will be returned to the Modifying Session screen to continue setting up the session by day.

Session Maintenance Sub-screen

If the information entered for a given session needs to be modified, users can access that information by selecting the session in the Active Session Information box on the School Maintenance screen and clicking on Modify Session (FIG. 2l). A user who has just created a session, is automatically taken to the Modify Session screen, a sub-screen of the Session Maintenance screen (FIG. 2p).

The Modify Session Screen and main Session Maintenance screen are very similar. The Modify Session sub-screen allows the user to change the fees, fee descriptions and attire for the session. The Java Warning may also be turned on or off in this screen. Changes are typed directly into the labeled text boxes an committed to the database by clicking on Update Session. The Extend Session button will take the user to the Extend Session sub-screen, as if they had selected the session on the School Maintenance screen.

To access an already created session for another school, the user enters the school number in the appropriate box on bar B1 at the top of the screen, and return to the School Maintenance screen for the school. Changing the school selection on the pull-down menu in the student information section of the screen takes the user to the Create Session screen for the new school.

Instead of asking for the default start and end times of the session, the Modify Session sub-screen contains the Session Day Information box (FIG. 2p). For each day in the session, the calendar date, start and end times of the day are listed. Also listed are the number of buckets available for each time slot of the day, and the Lock Status. The Lock Status allows the administrator to prevent students from scheduling portrait sittings on that day. If a day has been created, but for whatever reason no appointments are to be scheduled on that day, the user clicks on the listing and then on Lock/Unlock Day to changing the status of the day to Locked. The day can be unlocked at any point by selecting the listing, and clicking on the Lock/Unlock Day button again, changing the Lock Status to Available. In order to access the individual buckets of any one day of a given session, the user must select the day in the Session Day Information box, and click on the Update Day button, which is linked to the Session Day Maintenance screen.

Session Day Maintenance Screen

In order to organize appointments during a session day, Administrative users have the ability to manipulate the session day down to the bucket level. This is done on the Session Day Maintenance screen (FIGS. 2q and 2o).

The navigation bar B1 changes to reflect the function of the page. Users can move freely between every day in the session using the pull-down menu, or enter the appropriate Session ID to move to any other session in the database. The Back to Session button returns the user to the Modify Session sub-screen.

The Session Day Maintenance screen (FIG. 2q) has two main portions. The upper portion of the Session Day Maintenance screen allows for changes to be applied to a single day, or a large portion of that day. The user can perform one of four functions: Extend Day, Insert Buckets, Update Location, and Batch Update. The lower portion of the 'Session Day Maintenance, screen (FIG. 2r) shows the individual buckets of day, and whether those buckets are locked (indicated by an 'L' in the textblock), scheduled (indicated by an 'X' in the textblock), or free (indicated by an empty textblock). Each textblock has a checkbox beside it, to allow users to lock, i.e., freeze that individual bucket. A 'master' checkbox at the right-hand end of each row acts as a toggle for all the buckets in that time slot. The master checkbox will lock open buckets, or unlock locked buckets. Also, the master check box will lock over appointments.

Upper Portion: Batch Commands

Extends Day allows the user to add time slots to the start or end of the day. If, for example, the default start and end times is 9:00 AM and 4:30 Pm respectively, but for this one day the photographers will be at the school from 7:30 AM to 6:00 PM, Extend Day is used to add buckets for the hours of 7:30–9:00 AM. Extend Day is also used to add time slots from 4:30 PM to 6:00 PM. The user enters the new start and end times in the labeled text boxes and clicks on the Extend Day button. Note that the user must indicate the number of buckets to be created, but may indicate a number of buckets different from the default for the session, and that the user may specify to create these buckets locked. If the user indicates a non-adjacent time, for example, wanting to extend the day between 7:30 AM and 8:00 AM the day will be extended until 9:00 AM. The user will simply need to lock the unwanted time slots.

The same labeled text boxes are used to Insert Buckets (FIG. 2q). If, for example, between 11:30 to 2;30, the user wishes to create 6 buckets instead of 4, the user would enter 11:30 as the start time, and 2:30 as the end time. The user must specify the number of buckets to add, and can choose to lock those buckets.

Update Location (FIG. 2q) allows the user to create a new location for the session, or to update an already-stored location. Note that no new default location can be created—if a location is edited, those changes can be committed to every day in which that location is specified. However, if a new location is created, it must be specifically applied to every day for which that location is in effect. To edit an existing location, the user selects that location on the labeled pull-down menu, then clicks Edit Location. A pop-up window appears, containing the current location description in a text-box. The user clicks into the text box to modify the existing description, and clicks Update Location in the Pop-up window. The change is now reflected on every day that location was selected. To add a location, the user clicks on the Add Location button. A pop-up window containing an empty text box appears. The user inserts the location, and clicks on Add Location in the pop-up window. Note that this only commits the new location to the database. In order to actually apply a new location to a day, the user must select the session day, select the appropriate location, and then click on the Update Location button on the Session Day Maintenance screen.

Finally, on the upper part of the screen, the user can perform a Batch Update. Batch Update allows the user to lock or unlock a given number of open buckets in a specific time range. It will not overwrite already scheduled appointments. The user enters the start and end times, the number of buckets to affect, selects lock or unlock from the pull-down menu, and clicks on Lock/Unlock buckets to make the change.

Note that the user can use Extend Day to add more times and buckets to an individual day. To add more days to the schedule, the user must go to the Extend Session sub-screen.

Session Maintenance Sub-screen

Extend Session (FIG. 2s) allows a user to add more days to a session both before and after the current start/end dates. Users can access the Extend Session sub-screen from the School Maintenance screen by selecting the session in the Active Session Information box and clicking on Update Session (FIG. 2p). Users can also access the Extend Session sub-screen from the Modify Session sub-screen.

Before extending a session, users can create anew location, or simply indicate which of the locations already stored in the database is to be the default location for the additional days. The user then enters the new start and end date for the session. If the user wishes to add days to the beginning of the session only, they can leave the end date blank. Likewise if the user wishes to add days to the end of the session only, they can leave the start date blank. As during session creation, the user indicates the default start and end times for the new days, as well as the number of buckets for the new days. The user also indicates whether or not to lock Saturdays, and if the Java Warning should be on or off.

Clicking Extend Session will create the extra days. The user will then be taken to the Modify Session sub-screen to set up the individual days. Reset Fields blanks out the text boxes and no changes are made.

Messaging Maintenance

There are two types of messages that users can display to students. The general message displays when the student first enters their school number to set up an appointment. These messages are generally warning messages—if we are not currently at the school but will be returning within the next few months, or if there has been an emergency closing for the day. The second type of message is the confirmation message, which provides more detailed instructions to students who have scheduled an appointment.

Both types of messages are created on the Messaging Maintenance screen (FIG. 2t). Bar B1 of this screen enables the user to Modify an Existing message, View Universal Messages, or Create a New Message.

To change an existing message, the user selects a school from a restricted list-only schools that have messages already set up are included in the list. Clicking on Modify Existing Message brings up the school's messages in the Messages for Selected School box. The user then selects the message to modify. The message particulars are displayed in the Message Editor. The user can change the school for which the message is displayed, change the type of message, alter the message text, or change the start and expiration dates. The user then clicks on Update Message to apply the changes. If the school is changed, the message will only appear on the new school.

Figure 2U:
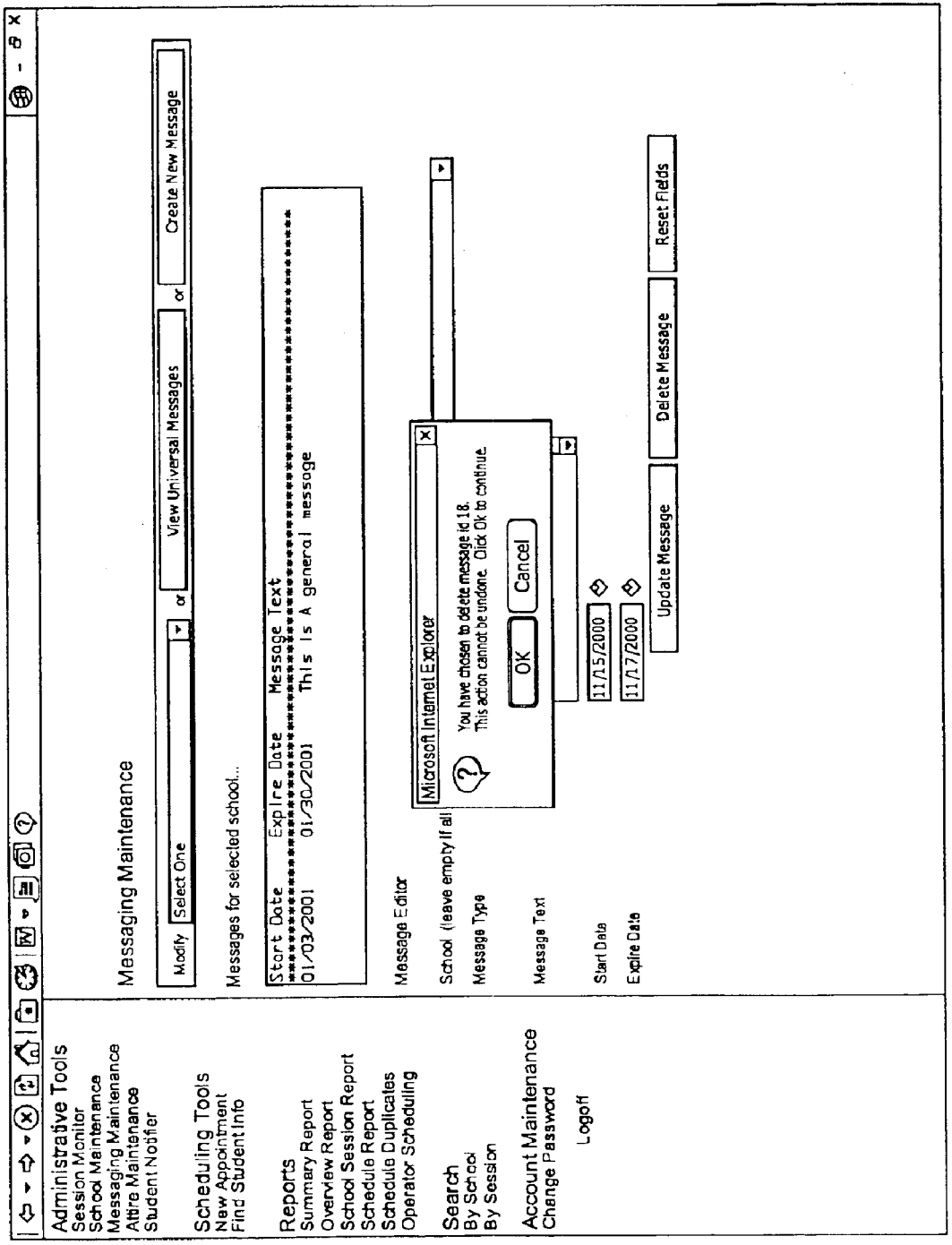
Figure 2A:
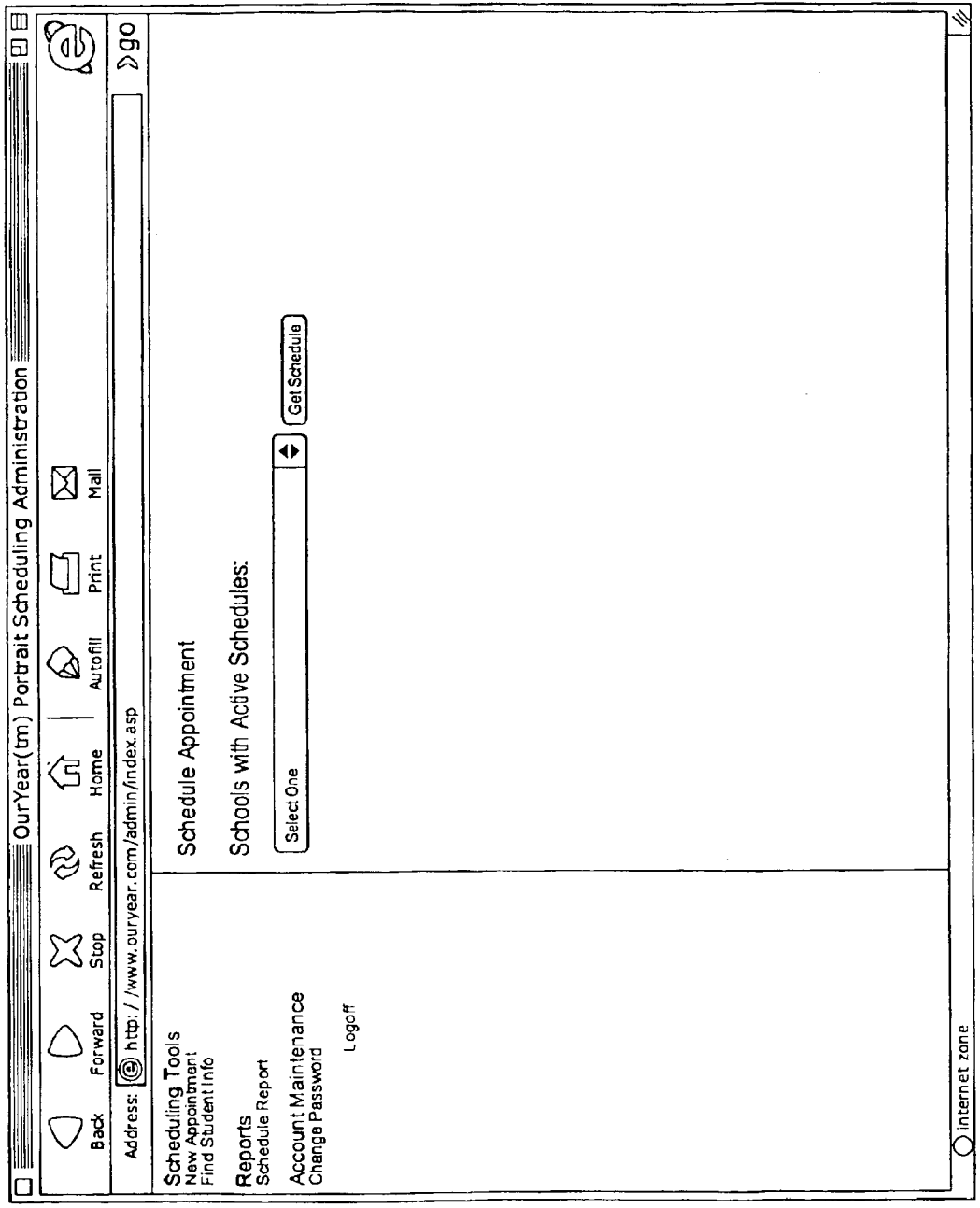
Figure 2A:
Figure 2A:
Figure 2G:
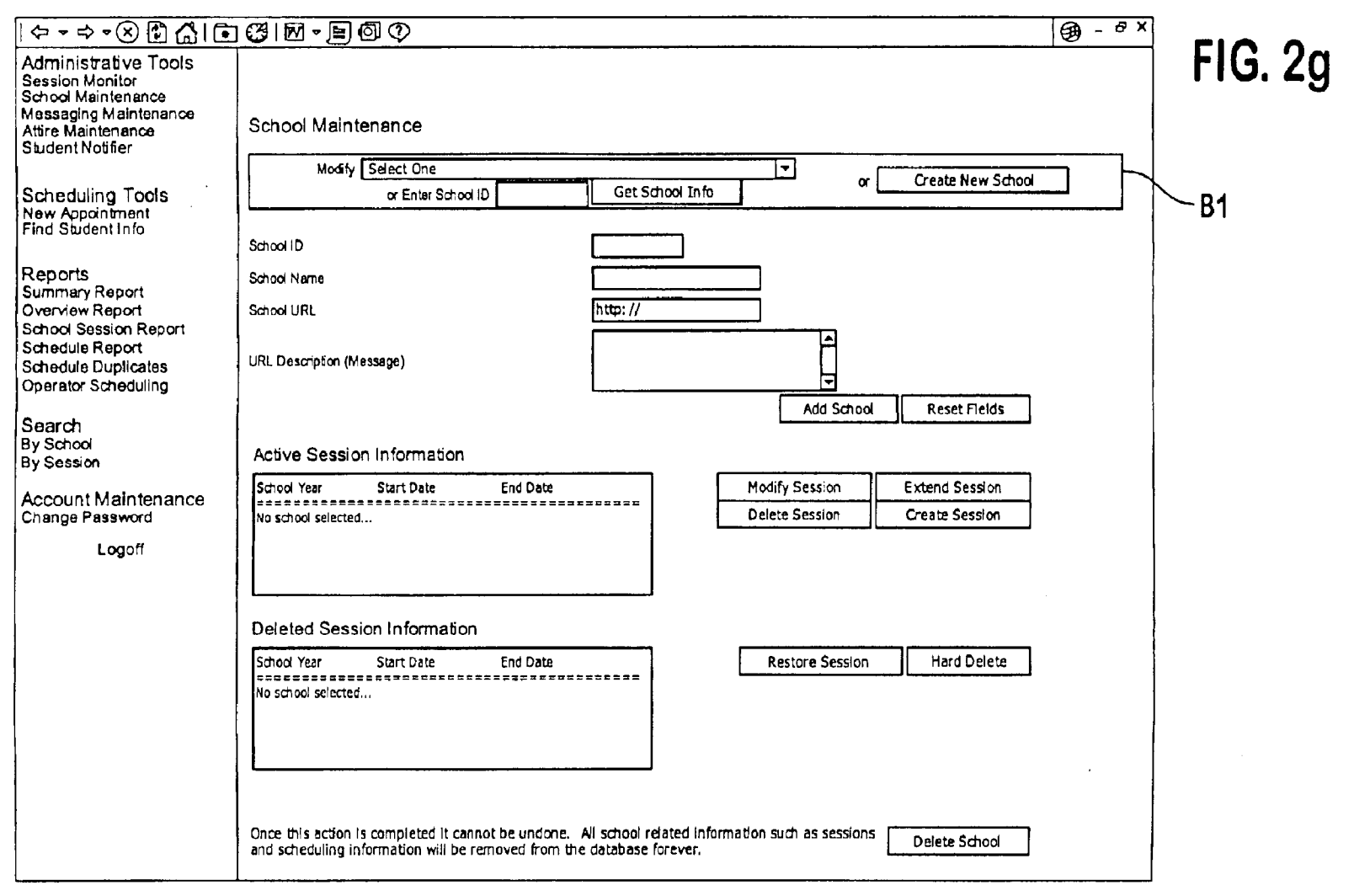
Figure 2H:
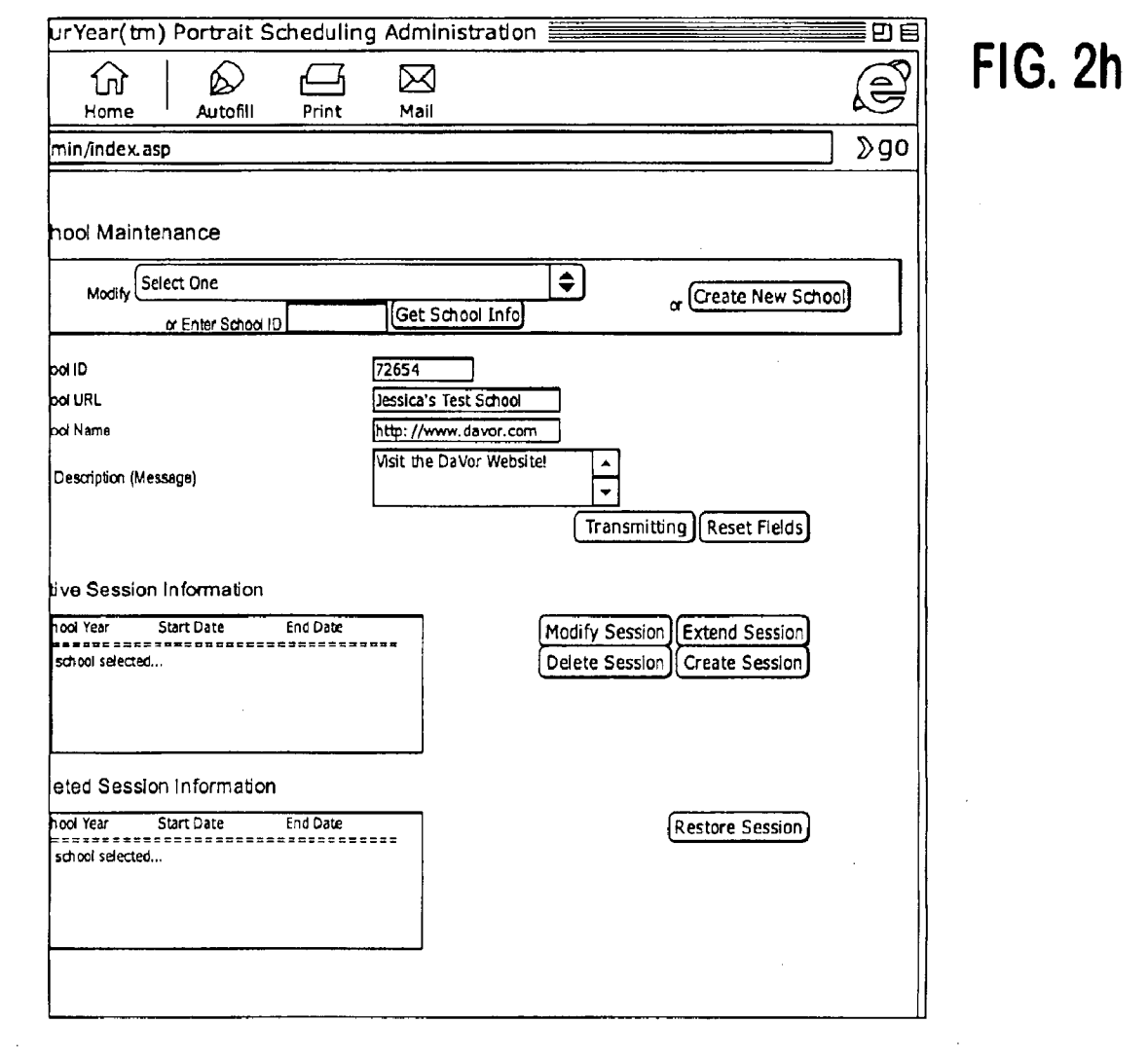
Figure 2K:
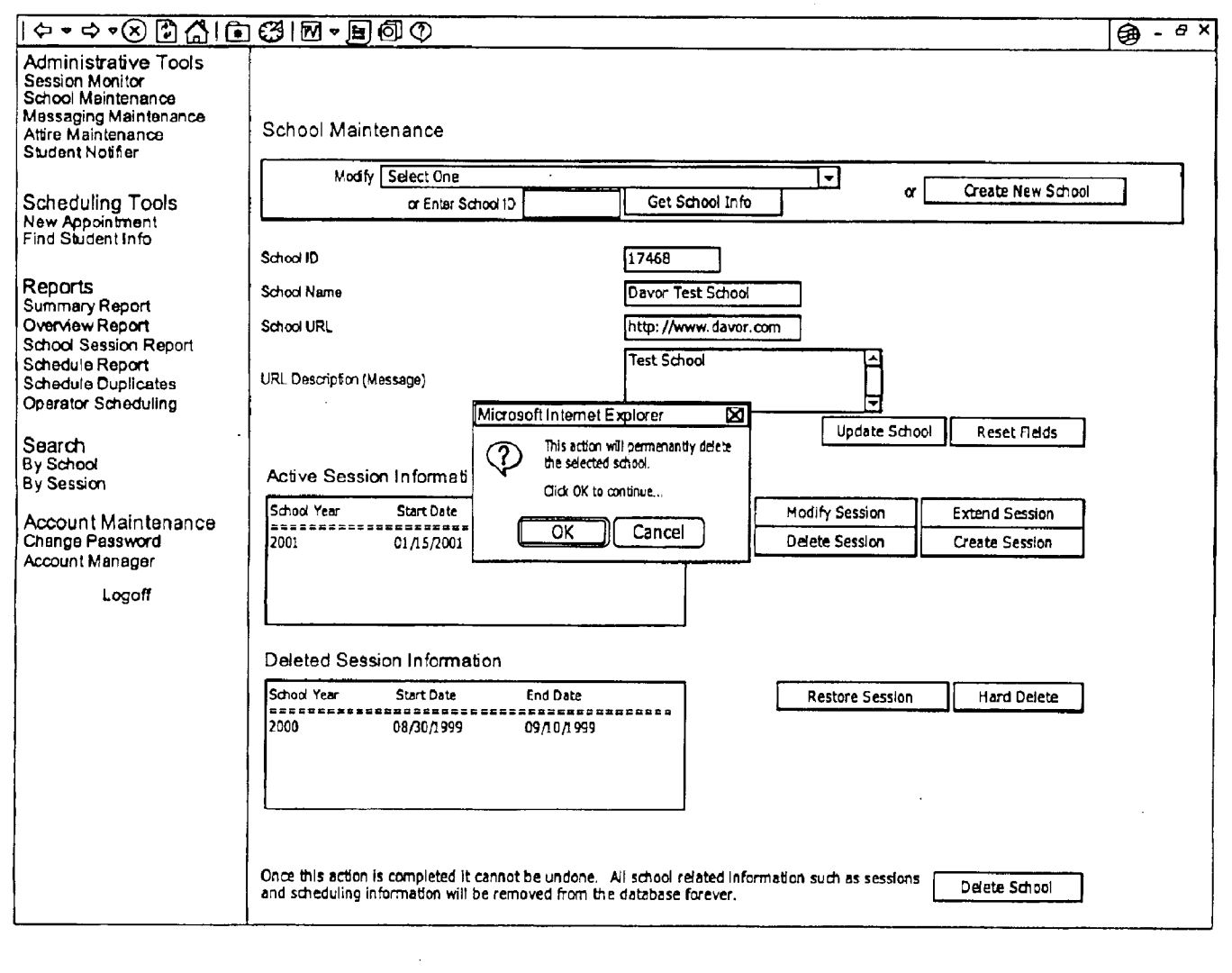
Figure 2M:
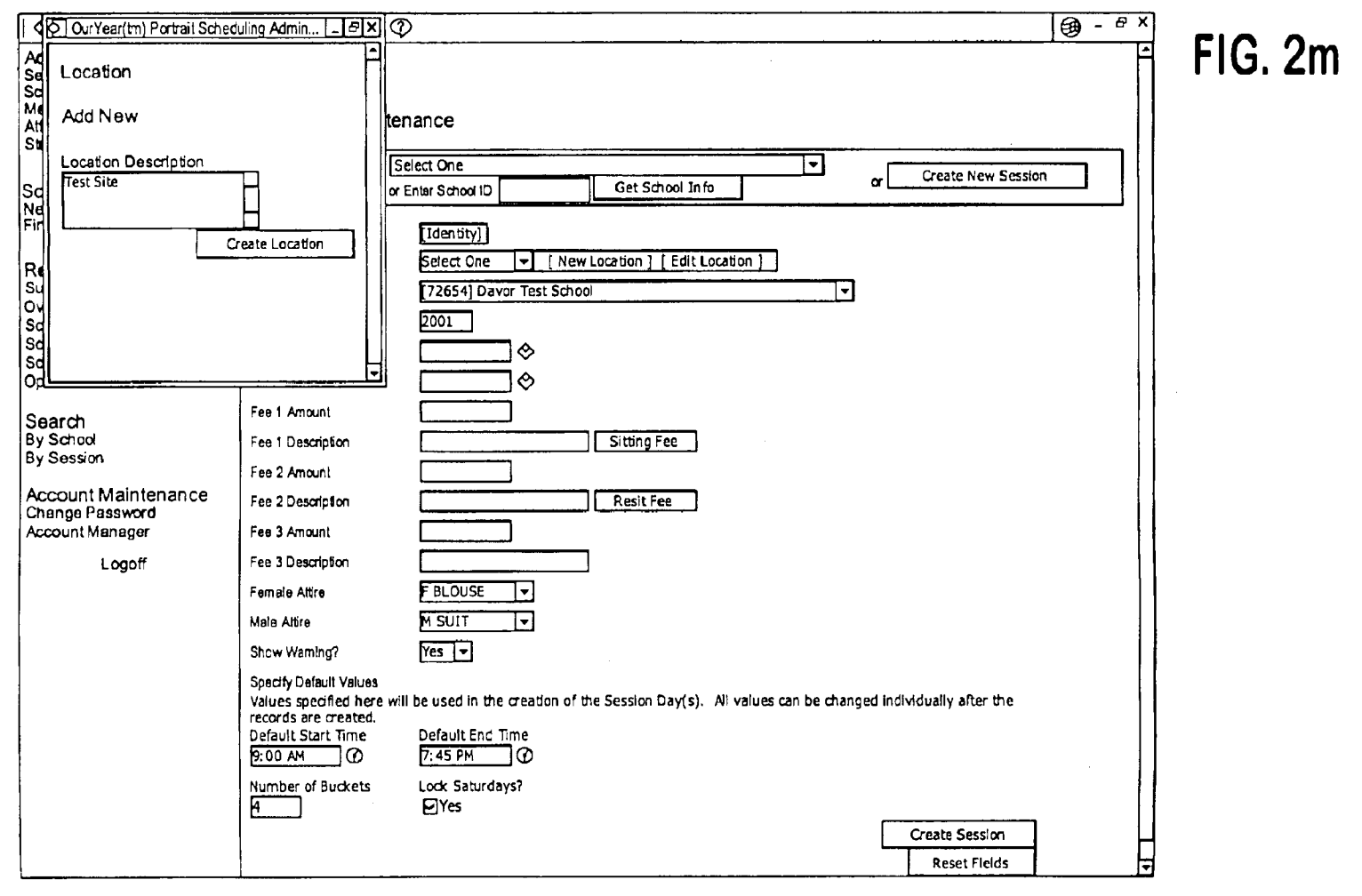
Figure 2N:
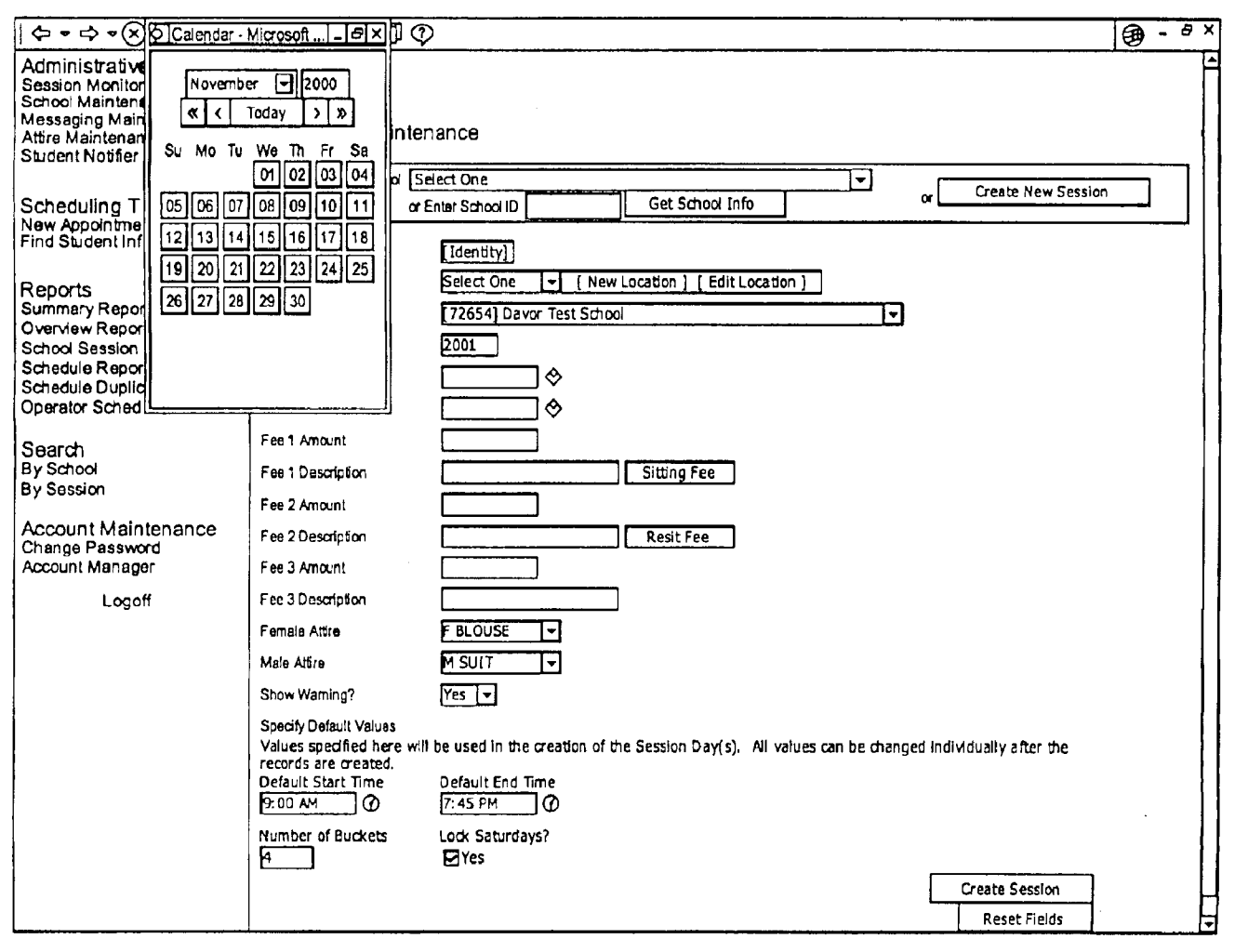
Figure 2Q:
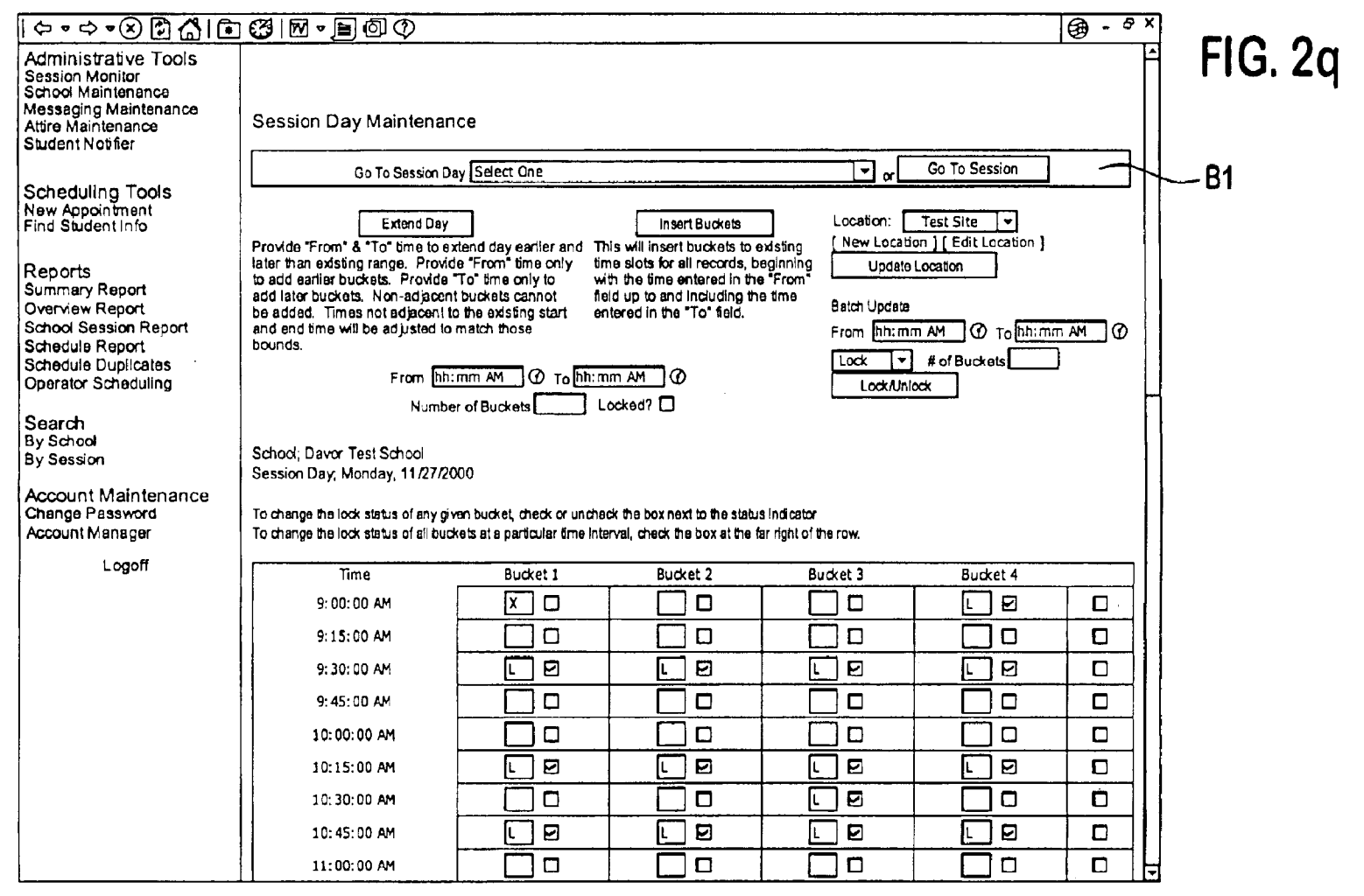
Figure 2W:
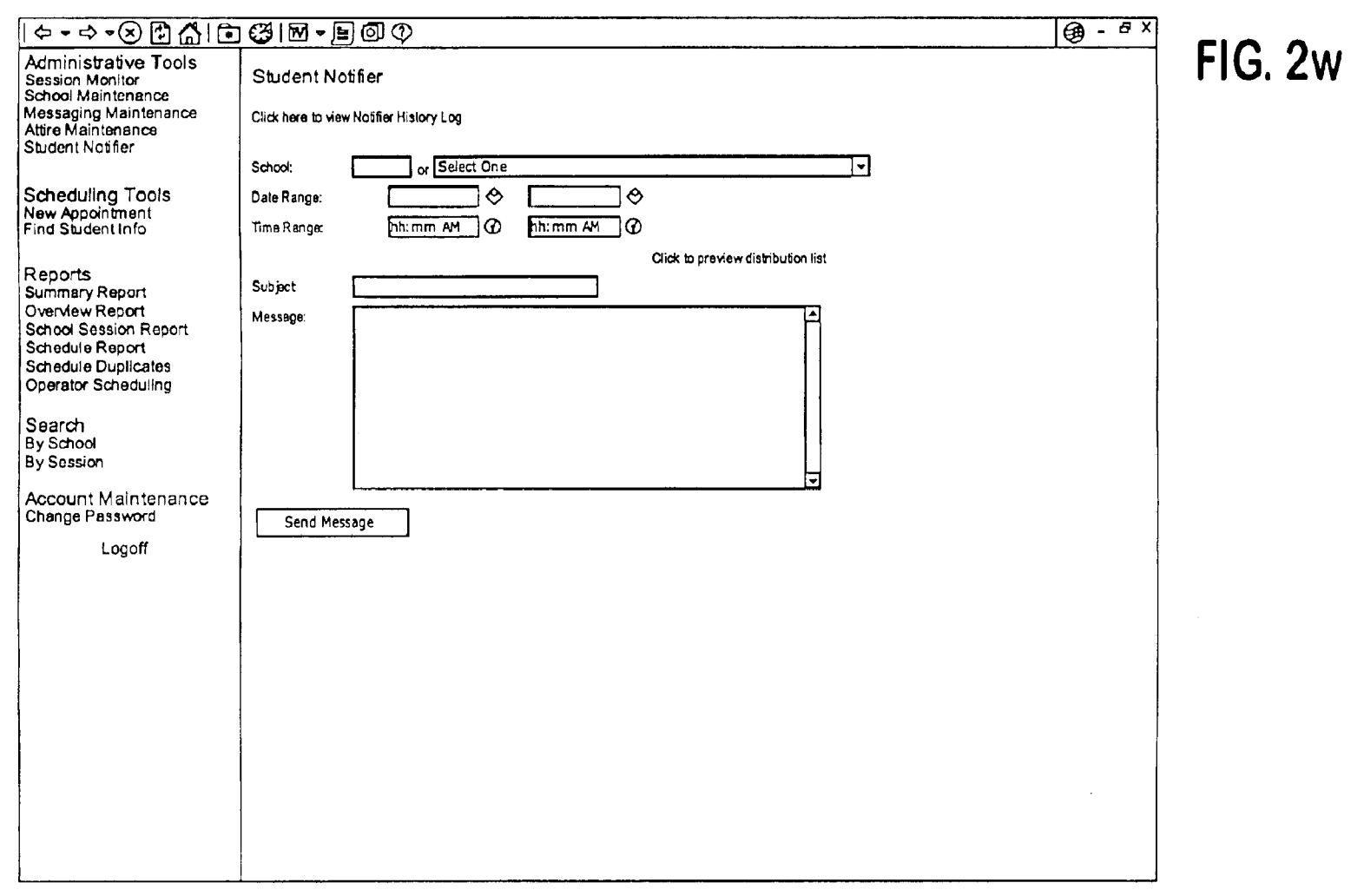
Figure 2Z:
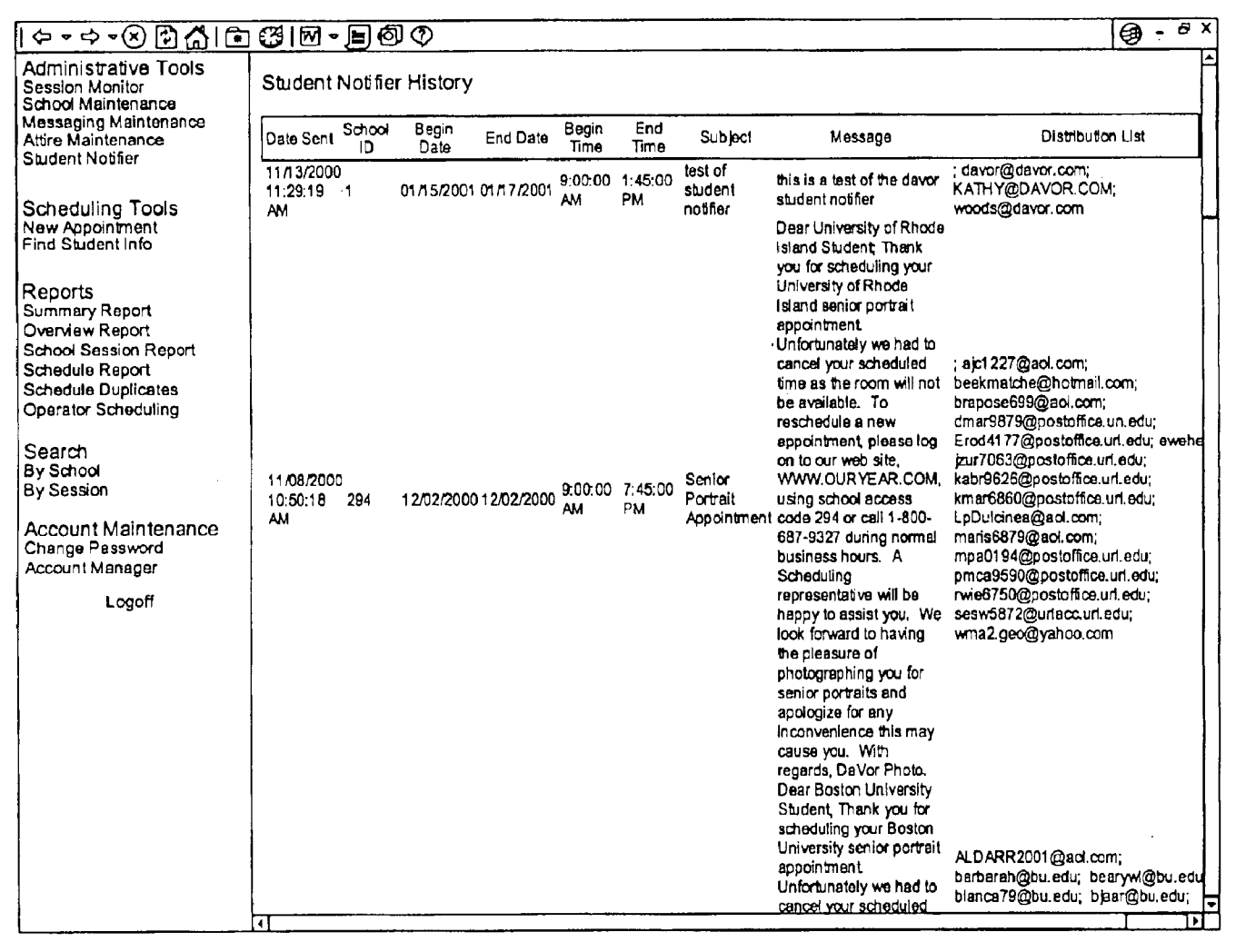
Figure 2A:
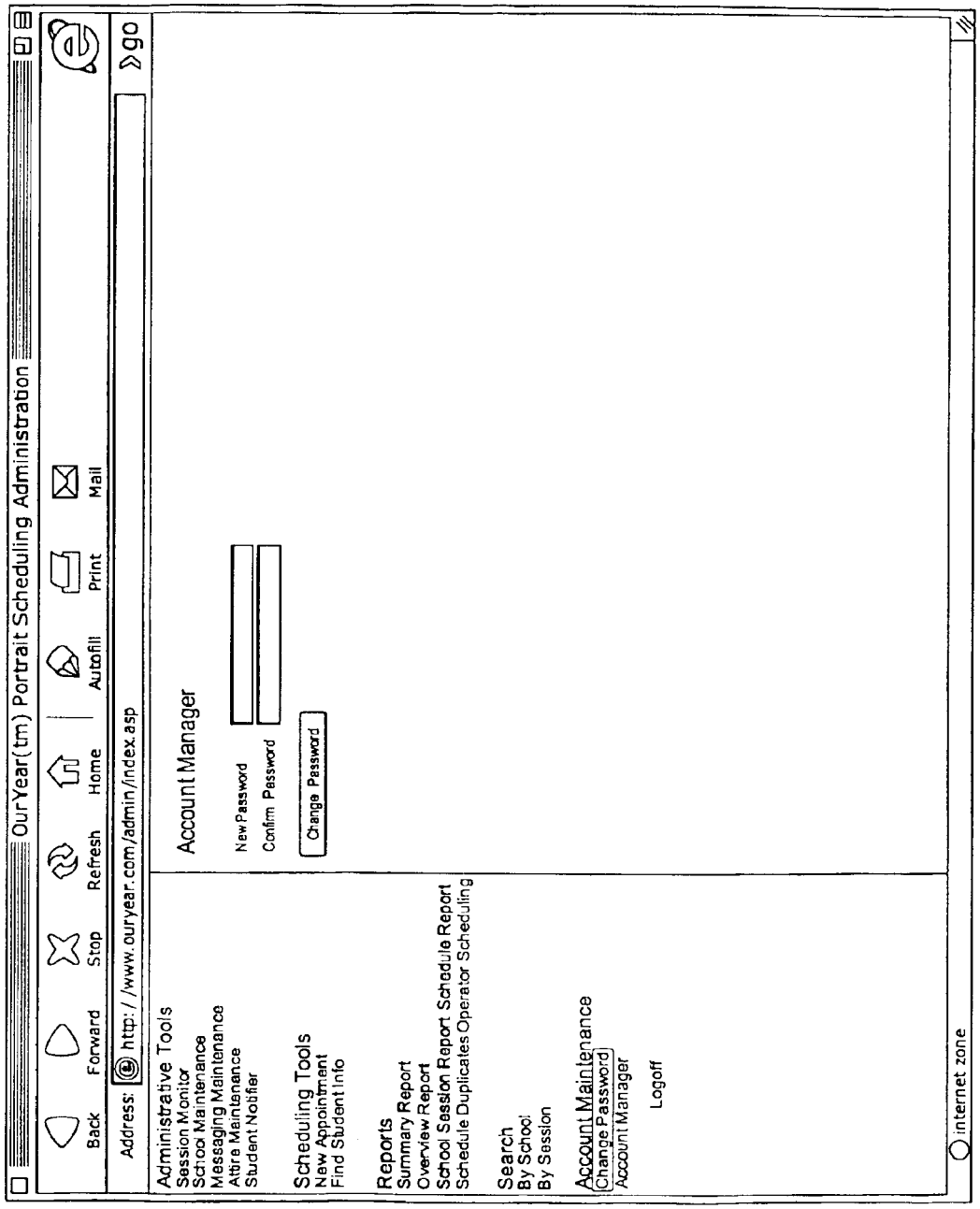

To delete an existing message, the user selects the school from the restricted list, selects the message in the Messages for Selected School box, and clicks on Delete Messages for Selected School box, and clicks on Delete Message. The system prompts the user for a confirmation before deleting the message (FIG. 2u).

Clicking on View Universal Messages displays any system-wide messages in the Messages for Selected Schools box. Universal Messages are updated or deleted in the same manner as school specific messages.

Clicking on Create new Message blanks all information in the Message Editor. The user then enters the school ID, or chooses the school from the labeled pull-down menu. The user specifies the type of the message (general or confirmation), enters the message in the textbox, and enters the start and expiration dates for the message. Note that while the system will not allow a user to enter an expiration date prior to the start date, the start and expiration dates do not have to correspond to the session start and end dates. The system confirms to the user that the message has been created.

For each school, more than one general or confirmation message can be created; however, if two messages of the same type are created for the same start and end date, the most recently created is the one that displays.

Attire Maintenance

The proper dress for a portrait sitting is denoted by the Attire values. Attire values are global—that is, their descriptions do not change from school to school. Each standard type of attire gets a short code phrase, a gender label, and a description. When a session is created, the user chooses the proper code phrase from the Attire List. When a student receives confirmation of an appointment in that school, the description of that attire, not the code phrase, is displayed.

Bar B1 on the Attire Maintenance screen (FIG. 2v) allows the user to Modify an existing Attire value selected from the database, or to create a new Attire value. If the user chooses to modify an Attire Value, only the description can be changed. Any other changes made will not be committed to the database One the description has been modified, the user clicks on Update Attire to commit the changes to the database.

Clicking on Create New Attire (bar B1) blanks all the Attire fields. The user must enter a code and the description, and select a gender designation. No Attire value can be created without all three pieces of information. Once these data have been entered, the user clicks on Add Attire to create the Attire value. The system will confirm that the attire has been created. In both cases, Reset Fields will blank the text boxes.

The default attires are Suit for men, and Blouse for women.

Student Notifier

The Student Notifier (FIG. 2w) allows users to e-mail all of the students on a particular schedule in case of cancellation or other difficulty. The notifier is non-session dependent-it is date driven. The user enters the school number or selects the school from the pull-down menu. The user then enters the affected dates and times, the subject line for the e-mail, and the message for students. The user may choose to preview the list of recipients before sending by clicking on the "Click to preview distribution list" link (FIG. 2x).

The user clicks on Send Message. Anyone who scheduled an appointment for those dates and times, and has entered a valid e-mail address, will receive the message. The system will return an error if no-one is scheduled for those dates and time, or if no school is selected (FIG. 2y).

The user can also view the e-mails that have previously been sent by clicking on the "Click here to view Notifier History Log" link (FIG. 2z). The log displays the date the message was sent, the school ID, the start and end dates for which the message was effective, the start and end times for which the message was effective, the subject and text of the message, and the distribution list to whom the message was sent.

Scheduling Tools

The Scheduling Tools are:
1) New Appointment
2) Find Student Information

New Appointment

The user clicks on New Appointment on the main menu and is prompted to choose a school (FIG. 2aa). Scheduling then proceeds as for a student as shown in FIG. 1b. Operators are not required to enter an e-mail address for a student, as a majority of the calls they take are for students without e-mail capabilities. Operators also do not click the "Confirm" button; instead they can return to another function by clicking on the appropriate link on the menu in the left most frame.

The operator verbally imparts the information on the confirmation screen to the student. Note that any general and confirmation messages created for the school will be displayed to the user before entering the student's information (FIG. 2ab).

Find Student Information

The Find Student Information screen (FIG. 2ac) enables the operator to enter any combination of:
first or last name
e-mail address
phone or confirmation number Find Student Information returns all students matching that criteria, with the option to cancel or reschedule a student (FIG. 2ad). If the student chooses to reschedule, the operator clicks on the Reschedule button, and repeats the process described for making a "New Appointment."

Reports

The Reports are:
1) Summary Report
2) Overview Report
3) Schedule Report
4) School Session Report
5) Schedule Duplicates
6) Operator Scheduling Summary Report The Summary Report (FIG. 2ae) provides the user with a summary of activity in the selected session, including how many buckets are open, locked, and scheduled. The report is broken down into activity by session week, with totals for each individual day in the week, each week in the session, and a grand total by session.

To obtain the Summary report, the user enters the school number or chooses the school from the pull-down menu in bar B1. The system retrieves the list of active sessions for that school from the database, and the user selects the correct session from the second pull-down menu in the navigation bar B1. The report displays in the right-most frame, below the navigation bar. The user can scroll down to view multiple weeks.

The user has the option of downloading the report to Microsoft Word. As server traffic an occasionally effect this download, a separate link is provided to troubleshoot.

Overview Report

The overview report (FIG. 2af) provides the user a snapshot of the session's activity on a per-time basis. Unlike the summary report, the overview report shows how many buckets are scheduled per time by day, by week, for every week of the session. The report shows, in bold, how many buckets are either scheduled or locked. Time slots for which all buckets are open display a zero. Time slots that are completely full are shaded in. The user can generally tell at a glance the busiest times.

To run the overview report, the user enters the school number or chooses the school from the pull-down menu in the navigation bar B1. The system retrieves the list of active sessions for that school from the database, and the user selects the correct session from the second pull-down menu in the navigation bar. The report displays in the right-most frame, below the navigation bar. The user may scroll down to view an entire day.

The user can download the report to Microsoft word. As server traffic can occasionally effect this download, a separate link is provided to troubleshoot.

School Session Report

The School Session report (FIG. 2ag) provides the user a list of each school in the database, and their current sessions. The report displays the schools in numerical order by school ID, and the associated session in numerical order by session ID. The report lists the start and end dates for each session, and the school year to which each session is assigned.

This report runs as soon as the user clicks on the School Session Report menu option (see menu portion M in FIG. 2ag). There is no additional information for the user to enter.

The user can download the report to Microsoft word. As server traffic can occasionally effect this download, a separate link is provided to troubleshoot. The user is also given the option of downloading this report to Microsoft Excel.

Schedule Report

The Schedule report (FIG. 2ah) lists for the users all of the students who have scheduled appointments for a session. The list displays in time order, and shows the student's name, telephone number, e-mail address, sitting status (whether or not they've ever been photographed in the past) and any comments the student or operator might have made at the time the appointment was scheduled.

To run the Schedule report, the user enters the school number or chooses the school from the pull-down menu in the navigation bar B1. The system retrieves the list of active sessions for that school from the database, and the user selects the correct session from the second pull-down menu in the navigation bar. Finally, the user must select the session day from a pull-down menu of active days. Users can only view one day of the Schedule at any given time.

The user has the option of downloading the report to Microsoft Word. The user can choose to download a single day's report, or the entire Schedule report (that is, the report containing information for every day in the session). As server traffic can occasionally effect this download, a separate link is provided to troubleshoot. The user is also given the option of downloading these reports to Microsoft Excel.

Duplicate Schedule Report

The Duplicate Schedule report (FIG. 2ai) lists all of the students who have scheduled more than one appointment in the active session. Only current active sessions are included in the search. The report lists the schools in numerical order by school ID and the session ID. For each session, the report lists the student's name and contact information, and below that, the date and time of each of the buckets scheduled in the student's name. Each bucket has an associated checkbox. If a student has scheduled too many buckets in a single session—the number decided upon by the administrators after examining the summary and overview reports for that session—the user may click on the checkbox to mark that bucket for deletion. At the end of the report screen, if the user decided to delete the extra scheduled buckets, the user clicks on the Delete Selected button (FIG. 1aj) to remove the duplicate appointments.

Operator Scheduling Report

The Operator Scheduling report displays the results of the Operator Tally function in one of two ways. The report can be run by school, by session to provide a list of all operators who scheduled in that session, and the total number of appointments each operator scheduled (FIG. 2ak). The report can also run by operator ID to provide a list of all sessions which a given operator scheduled, and the total number of appointments in each session (FIG. 1al). This version of the report includes the Operator'Tally as well—the total number of buckets scheduled by that operator broken down by date (FIG. 2am).

To run the Operator Scheduling report by school, the user enters the school number or chooses the school from the pull-down menu in the navigation bar B1. The system retrieves the list of active sessions for that school from the database, and the user selects the correct session from the second pull-down menu in the navigation bar. The report displays in the right-most frame, below the navigation bar. The report displays the selected school and session IDs above a two-column list. The Operator ID is the left column and the number of scheduled buckets for the selected session is in the right column (FIG. 2ak).

To run the Operator Scheduling report by Operator, the user chooses the Operator ID from the labeled pull-down menu in the navigation bar B1. The report displays the Operator ID above a three column list (FIG. 2al). The school name is in the first column, the session ID in the second column, and the number of scheduled buckets for that school session in the final column. Beneath the Scheduling by Operator list, a second two-column list displays. Labeled Operator Tally Report, the first column of this list contains a date. The second column contains the total number of buckets and the operator scheduled on the date (FIG. 2am).

These reports can be printed using the browser's print function.

Search

The Search functions are:
1) By School
2) By Session

Search by School

The By School search (FIG. 2an) lists all sessions in the database for any given school number. The search returns the session IDs and the start and end dates of the session. Sessions marked for deletion (that is, sessions currently displayed in the Deleted Session Information box) are listed as well; they are labeled "deleted" beside their session ID in the report. For example, "deleted" is inserted next to the ID on the bottom line shown in FIG. 2an.

To run, the user enters the school number in the labeled text box or selects the school from the labeled pull-down menu.

Search by Session

The By Session search (FIG. 2ao) displays the school and session information for a given session ID, including the start and end dates of the session. This search allows the user a quick look-up for session IDs. The report will return an error message if no session ID matches the entered value, the error message taking the place of the school and session information.

To run, the user enters the session ID in the labeled text box.

Account Maintenance

The Account Maintenance functions are:
1) Change Password
2) Account Manager

Change Password

Every user is given the ability to change his or her own password at will using the change Password function (FIG. 2ap). To change a password, the user must enter their new password twice, first in the text box labeled "New Password" and then in the "Confirm" text box. Because the user must be logged in to change their password, they are not required to enter their original password again and merely click on the Change of Password button.

Account Manager

The Account manager provides users the ability to create and assign to new user names, and to modify privileges of existing user names. Two screens comprise the Account Manager. The first screen (FIG. 2ag) lists the currently active accounts in the database, and allows the user to either modify or delete these accounts, or to create a new account. The second screen accepts the user information and allows the user to either modify or delete these accounts, or to create a new account. The second screen accepts the user information and allows any changes. When editing an account, the original information is displayed in the labeled text boxes, and the current privileges are marked (FIG. 2ar). When creating a new account, the text boxes above the privilege boxes are empty, and all possible privileges are listed (FIG. 2as). Clicking Reset clears the information in those fields. Clicking on "Back" B2 allows the user to leave the screen without making any changes. Clicking on Create Account or Update Account commits the changes made to the database.

To create a typical Sales level user, only the "Sales" box is checked. To create a typical Operator level user, both the Sales and Operator boxes are checked. Administrative level users are given access to Sales, Operator, And Administrative levels. Finally, Systems level users are given access to all levels by checking all boxes.

In summary the access codes assigned to different levels of users control the scope of the access to which each level is entitled to access.

The top level access code entitles this administrative level to access all screens and wherein the actions (changes, deletions, etc) which can be taken at this level are unrestricted.

The lower level access codes enables an "operator" with the administrator group access to search students by last name and/or reservation number upon entry of the low level access code and the school ID. In a similar manner, the sales and Administrative level have limited access as has been described.

FIGS. 7, 7a and 8 are simplified flow diagrams respectively showing the program steps for the student/school program (FIGS. 7 and 7a) and the administrator's program steps (FIG. 8).

What is claimed:

1. A method employing a computer network for administering a schedule created by an administrator for use by members of a group entitled to make appointments, comprising:

(a) generating and storing a schedule for use by members of a given group including providing a predetermined given number of time slots on a given number of days;

(b) assigning a user access code for use by members of said given group for entering appointment data into a database;

(c) assigning an administration access code for use by an administrator, including providing a first level access code and at least a second level access code, said first level access code enabling viewing of all dates which can be displayed and said second level access code permitting limited access to said database;

(d) providing a first display prompting an administrator to enter an access code when reaching the first display including providing access codes for four levels of access including:

a sales access level enabling a sales person to access a first group of reports based on data in the database;

an operator access level enabling an operator to schedule an appointment requested by telephone and a second group of reports based on data in the database, said second group of reports being different from said first group of reports;

an administrative access level enabling an administrator to create and delete different groups of members making appointments and third group of reports based on data in the database, the third group of reports including reports provided to said sales and operator levels; and a systems access level enabling a person having a systems level access code to access all of the reports and capabilities available to the sales, operator and administrative level;

(e) providing a second display responsive to entry of a proper access code, presenting prompts to select a given request from a noun of requests including providing at least one prompt to change a feature of a group of data of at least one of the displays capable of being requested when said first level access code is entered and a prompt to change a starting time for appointments on a given day responsive only to entry of a valid administration access code; and (f) displaying results of the requested search;

displaying the information including displaying fees related to the appointment; and, (g) sending an e-mail to the designated user upon confirmation of the appointment and sending a further e-mail to the designated user several days prior to the scheduled appointment.

2. The method of claim 1 wherein providing a system access level code further includes enabling a person having a systems level access code to control data to which all of the remaining levels are entitled to access.

3. The method of claim 1, wherein step (e) includes a prompt to an administrator to remove one appointment of a member of a member of said group who has entered more than one appointment.

4. The method of claim 1, wherein step (e) includes a prompt to print a copy of the requested display.

5. The method of claim 1, wherein step (e) includes a prompt to change an ending date of said schedule.

6. The method of claim 1, wherein step (e) includes a prompt to change a number of appointments during a day.

7. The method of claim 1, wherein step (e) includes a prompt to prevent appointments from being made on a given day and at a given time.

8. The method of claim 7, wherein said given day is one of a weekend day and a holiday.

9. The method of claim 1, wherein step (e) includes a prompt to add hours to a given scheduled day.

10. The method of claim 9, wherein the hours added are added either before the first previously scheduled hour or after the last previously scheduled hour.

11. The method of claim 1, wherein step (e) includes a prompt responsive to a valid administration code to enable an administrator to provide a message for a display presented to members of a group designated to enter appointment dates.

12. The method of claim 11, wherein the step of providing a message includes manually inputting a desired message.

13. The method of claim 1, wherein step (e) includes a prompt to select a status of said schedule.

14. The method of claim 13, further comprising:
(h) generating a total number of appointment time slots taken and a total number of time slots available; and
(i) displaying the results of the generating step when the status of said prompt to select a status of said schedule is selected.

15. The method of claim 1, further comprising:
(h) enabling an administrator to freeze given appointment slots when said second level access code is entered and the user clicks on a freeze prompt provided on said display.

16. The method of claim 1, further comprising:
(h) enabling a hard copy of the scheduled appointment to be printed.

17. The method of claim 1, further comprising:
(h) comparing a received access code to the assigned user access code for use by members of said given group.

18. The method of claim 17, further comprising:
(i) restricting the entering of appointment data into the database if the received access code does not match the assigned user access code.

19. The method of claim 17, further comprising:
(h) receiving a user confirmation code from a member of said given group; and
(i) enabling said member to alter previously entered appointment data if the receiver used confirmation code is a valid user confirmation code for said member.

20. The method of claim 1, further comprising:
determining a user confirmation code when a member of said given group enters appointment data into the database using the assigned user access code.

* * * * *